United States Patent
Hasegawa et al.

(10) Patent No.: US 9,096,770 B2
(45) Date of Patent: Aug. 4, 2015

(54) INKJET RECORDING INK SET, INK CARTRIDGE, INKJET RECORDING DEVICE, INKJET RECORDING METHOD, AND IMAGE FORMED MATTER

(75) Inventors: Shin Hasegawa, Shizuoka (JP); Hiroyuki Fushimi, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/009,253

(22) PCT Filed: Apr. 2, 2012

(86) PCT No.: PCT/JP2012/059616
§ 371 (c)(1),
(2), (4) Date: Oct. 1, 2013

(87) PCT Pub. No.: WO2012/133953
PCT Pub. Date: Oct. 4, 2012

(65) Prior Publication Data
US 2014/0036010 A1    Feb. 6, 2014

(30) Foreign Application Priority Data
Apr. 1, 2011 (JP) .................. 2011-081980

(51) Int. Cl.
*C09D 11/02* (2014.01)
*C09D 11/326* (2014.01)
(Continued)

(52) U.S. Cl.
CPC ............. *C09D 11/326* (2013.01); *B41J 2/01* (2013.01); *B41J 2/17503* (2013.01); *C09D 11/102* (2013.01); *C09D 11/322* (2013.01); *C09D 11/40* (2013.01)

(58) Field of Classification Search
CPC ..................................... C09D 11/40
USPC .................. 106/31.6, 31.86, 31.89, 31.65
See application file for complete search history.

(56) References Cited

U.S. PATENT DOCUMENTS

| 5,085,698 A | 2/1992 | Ma et al. |
| 5,172,133 A | 12/1992 | Suga et al. |

(Continued)

FOREIGN PATENT DOCUMENTS

| CN | 1341514 A | 3/2002 |
| CN | 101925662 A | 12/2010 |

(Continued)

OTHER PUBLICATIONS

Written Opinion of the International Searching Authority Issued May 1, 2012 in PCT/JP12/059616 Filed Apr. 2, 2012.

(Continued)

*Primary Examiner* — Veronica F Faison
(74) *Attorney, Agent, or Firm* — Oblon, McClelland, Maier & Neustadt, L.L.P.

(57) ABSTRACT

To provide an inkjet recording ink set, which contains a cyan ink, magenta ink, yellow ink, and black ink, wherein each ink contains at least a pigment, a surfactant, water, water-soluble organic solvent, and anionic self-emulsifying ether-based polyurethane, wherein each ink contains, as the pigment, a combination of a (i) pigment dispersion liquid, in which the pigment is dispersed in water with assistance of the surfactant, and a (ii) resinous polymer-coated pigment dispersion liquid, in which the pigment is coated with a resinous polymer and dispersed in water, and wherein the (i) pigment dispersion liquid and the (ii) resinous polymer-coated pigment dispersion liquid satisfy the following formula: $|A-B| \leq 30$ nm where A is the average particle diameter (D50) of the dispersed pigment in the (i) pigment dispersion liquid, and B is the average particle diameter (D50) of the dispersed resinous polymer-coated pigment in the (ii) pigment dispersion liquid.

20 Claims, 1 Drawing Sheet

(51) Int. Cl.
*C09D 11/102* (2014.01)
*C09D 11/322* (2014.01)
*C09D 11/40* (2014.01)
*B41J 2/01* (2006.01)
*B41J 2/175* (2006.01)

(56) References Cited

U.S. PATENT DOCUMENTS

| | | | |
|---|---|---|---|
| 5,221,334 A | 6/1993 | Ma et al. | |
| 5,571,311 A | 11/1996 | Belmont et al. | |
| 6,143,807 A | 11/2000 | Lin et al. | |
| 6,710,022 B1 | 3/2004 | Kwetkat et al. | |
| 6,740,152 B1 | 5/2004 | Fukuda | |
| 7,101,919 B2 | 9/2006 | Hasegawa et al. | |
| 7,798,629 B2 | 9/2010 | Hakiri et al. | |
| 2003/0008080 A1 | 1/2003 | Doi et al. | |
| 2003/0196571 A1 | 10/2003 | Hakiri et al. | |
| 2006/0098067 A1* | 5/2006 | Imai et al. | 347/100 |
| 2006/0209149 A1 | 9/2006 | Hasegawa et al. | |
| 2006/0272543 A1 | 12/2006 | Hakiri et al. | |
| 2008/0036830 A1 | 2/2008 | Natori et al. | |
| 2008/0207805 A1 | 8/2008 | Blease et al. | |
| 2009/0169761 A1* | 7/2009 | Szajewski et al. | 427/466 |
| 2009/0186162 A1* | 7/2009 | Namba et al. | 427/511 |
| 2010/0277548 A1 | 11/2010 | Hakiri et al. | |
| 2010/0302306 A1 | 12/2010 | Hasegawa et al. | |
| 2010/0309260 A1 | 12/2010 | Hakiri et al. | |
| 2011/0071250 A1 | 3/2011 | Naruse et al. | |
| 2011/0074865 A1 | 3/2011 | Hasegawa et al. | |
| 2011/0267398 A1 | 11/2011 | Hakiri et al. | |
| 2012/0026237 A1 | 2/2012 | Hakiri et al. | |
| 2012/0062646 A1 | 3/2012 | Hasegawa et al. | |
| 2012/0154492 A1 | 6/2012 | Hakiri et al. | |
| 2012/0207984 A1 | 8/2012 | Hasegawa et al. | |
| 2013/0038660 A1 | 2/2013 | Hasegawa et al. | |
| 2013/0202862 A1 | 8/2013 | Hasegawa et al. | |

FOREIGN PATENT DOCUMENTS

| | | |
|---|---|---|
| EP | 0688836 A2 | 12/1995 |
| JP | 56-147871 | 11/1981 |
| JP | 05-239392 | 9/1993 |
| JP | 08-003498 | 1/1996 |
| JP | 08-081646 | 3/1996 |
| JP | 08-283633 | 10/1996 |
| JP | 08-333531 | 12/1996 |
| JP | 09-194775 | 7/1997 |
| JP | 2000-063727 | 2/2000 |
| JP | 2000-144028 | 5/2000 |
| JP | 2001-081366 | 3/2001 |
| JP | 2001-146564 | 5/2001 |
| JP | 2002-003767 | 1/2002 |
| JP | 2003-509571 | 3/2003 |
| JP | 3470484 | 9/2003 |
| JP | 2004-123904 | 4/2004 |
| JP | 3625595 | 12/2004 |
| JP | 2005-105227 | 4/2005 |
| JP | 2005-281691 | 10/2005 |
| JP | 2005-314528 | 11/2005 |
| JP | 2006-008858 | 1/2006 |
| JP | 2006-045436 | 2/2006 |
| JP | 2006-188626 | 7/2006 |
| JP | 2006-219584 | 8/2006 |
| JP | 2006-282781 | 10/2006 |
| JP | 2006-335858 | 12/2006 |
| JP | 2007-119551 | 5/2007 |
| JP | 2007-186642 | 7/2007 |
| JP | 2007-211058 | 8/2007 |
| JP | 2007-231191 | 9/2007 |
| JP | 2009-280749 | 12/2009 |
| JP | 2010-520324 | 6/2010 |
| JP | 2011-231265 | 11/2011 |

OTHER PUBLICATIONS

International Search Report Issued May 1, 2012 in PCT/JP12/059616 Filed Apr. 2, 2012.
U.S. Appl. No. 13/832,630, filed Mar. 15, 2013, Hasegawa, et al.
U.S. Appl. No. 13/760,317, filed Feb. 6, 2013, Hasegawa, et al.
Combined Chinese Office Action and Search Report issued Apr. 3, 2014 in Patent Application No. 201280016366.7 (with English language translation).

* cited by examiner

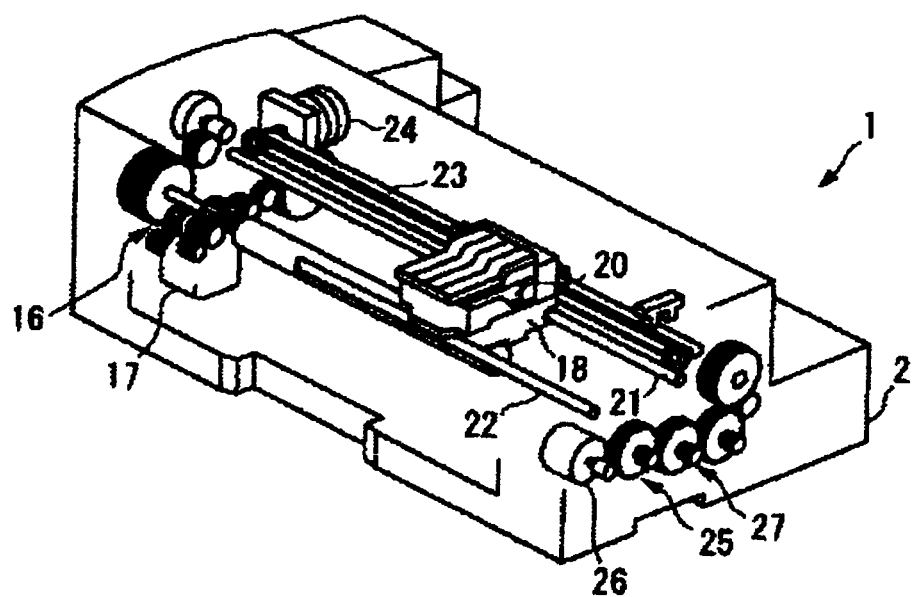

INKJET RECORDING INK SET, INK CARTRIDGE, INKJET RECORDING DEVICE, INKJET RECORDING METHOD, AND IMAGE FORMED MATTER

TECHNICAL FIELD

The present invention relates to an inkjet recording ink set that provides a high image density and, at the same time, possesses excellent ejection stability, and excellent ink liquid storage stability.

BACKGROUND ART

Inkjet recording methods are advantageous in that, by virtue of a simpler process than that of other recording methods, the formation of full-color images is easy and, even in apparatuses having a simple construction, high-resolution images can be obtained.

Dye-based inks obtained by dissolving various water soluble dyes in water or a mixed liquid composed of water and an organic solvent are used as ink for inkjet. Dye-based inks can yield images having a sharp color tone but on the other hand, are poor in lightfastness.

On the other hand, pigment-based inks with carbon black or various organic pigments dispersed therein are superior in lightfastness to dye-based inks and thus are actively studied.

Pigment-based inks, however, are more likely to cause nozzle clogging than dye-based inks.

The pigment-based inks are generally prepared by preliminarily dispersing a coloring material and a dispersant in an aqueous solvent such as water or an alcohol to prepare a dispersed material, then subjecting the dispersion to a step of dispersing the dispersed material with a media-type disperser such as a sand mill to a predetermined degree, and then diluting the dispersion to give a predetermined concentration.

In pigment-based aqueous inks, in order to disperse hydrophobic pigments, it is common practice to use surfactants or water-soluble resins. However, the reliability of the formed images is very poor. Accordingly, a technique has been disclosed in which fine resin particles having a film forming property are added to an ink liquid with a view to improving the image quality. However, it is difficult to keep a plurality of ingredients in a finely and stably dispersed state for a long period of time. The use of a large amount of a dispersant such as a surfactant to stably disperse the fine particles disadvantageously poses problems such as the occurrence of air bubbles within ink tanks or heads or deteriorated image quality. Further, for dispersibility improvement purposes, studies have been made to adopt a method for converting groups on the surface of the pigment to hydrophilic groups or to use hydrophilic group-containing resins. In this technique, when a single type of pigment is used, the pigment can be stably dispersed, but on the other hand, when a plurality of types of pigments are mixed together, the dispersion is unstable, posing a problem of deteriorated storage stability.

Reports have been given on surface-treated pigment inks that can provide excellent print quality and also possess excellent ejection stability and storage stability (PTL 1, PTL 2, and PTL 3), ink sets that can maintain stable ink ejection (PTL 4), a method in which a water-insoluble coloring material and electrifiable pseudo-fine particles of resin having a size smaller than the coloring material are incorporated in inks with a view to obtaining a high image density (PTL 5), a method in which a self-dispersible pigment having a limited DBP oil absorption is incorporated (PTL 6), and an aqueous carbon black dispersion that comprises a surface-modified carbon black, has an HLB value of 7 to 18, and contains a nonionic surfactant having an acetylene skeleton (PTL 7). Further, aqueous inks using an acetylene glycol surfactant are also reported (PTL 8).

Further, disclosures have been made on a method in which a water-dispersible resin having carboxyl and nonionic hydrophilic group in its molecule is dispersed in water to stabilize dispersion liquid (PTL 9), a method in which a water-soluble polymer and a surfactant, which have the same polarity or one of which is nonionic, are added (PTL 10), a method in which, in an aqueous recording liquid, a colorable ionic group-containing polyester resin and a colorant, which are identical to each other in polarity of a hydrophilic group, are used (PTL 11), and a method in which a pigment and fine resin particles, which are identical to each other in polarity of dispersion, are used (PTL 12). Further, a printing ink using a gemini surfactant as a dispersant has been disclosed (PTL 13).

Further, a proposal has been made on an aqueous inkjet ink composition containing a pigment dispersion containing pigment particles having such a particle size distribution that at least 70% of the particles in the dispersion is accounted for by particles having a diameter of less than 0.1 μm and the other particles in the dispersion have a diameter equal to or less than 0.1 μm, an aldehyde naphthalene sulfonate dispersant, and/or at least one sulfone solvent (PTL 14). A proposal has also been made on a recording liquid containing a pigment, a polymeric dispersant, and a nonionic surfactant (PTL15). A proposal has also been made on the use of an AB or BAB block copolymer as a dispersant for pigments (PTL16 and PTL17). Further, a proposal has also been made on the use of a specific pigment, a water-soluble resin, and a solvent (PTL18).

On the other hand, proposals have been made on methods for dispersing pigments without use of a dispersant, that is, a method in which a water solubilizing group-containing substituent is introduced into carbon black (PTL 19), a method in which a water-soluble monomer or the like is polymerized on the surface of carbon black (PTL 20), and a method in which carbon black is oxidized (PTL 21). Further, a proposal has been made on a method in which waterfastness and ejection stability are ensured by an ink containing an oxidized carbon black and a terpolymer of acrylic acid, styrene, and α-methyl styrene (PTL 22).

Further, a proposal has also been made on an inkjet recording liquid containing dispersed particles having a volume average particle diameter of 30 nm to 200 nm (PTL 23).

Regarding the proposed conventional ink liquids, the color pigment inks can realize a high image density. However, the black pigment inks are unsatisfactory yet.

Further, a proposal has also been made on the use of beads having a diameter of 0.05 mm to 1.0 mm in beads mill dispersion liquid (PTL24 to PTL26). None of these proposals are satisfactory in dispersion stability.

In PTL27, an anionic surfactant is used as the dispersant, and the molecular weight is preferably in a range of $1{,}000 \leq m \leq 30{,}000$. These do not provide satisfactory dispersion stability, and pigments species that are weak against impact exposed during dispersion lack in stability after the dispersion, posing a problem of, for example, ejection stability of ink liquids.

CITATION LIST

Patent Literature

PTL 1: Japanese Patent Application Laid-Open (JP-A) No. 2007-186642
PTL 2: JP-A No. 2006-282781
PTL 3: JP-A No. 2005-105227
PTL 4: JP-A No. 2007-119551
PTL 5: JP-A No. 2006-8858
PTL 6: JP-A No. 2002-3767
PTL 7: JP-A No. 2006-219584
PTL 8: JP-A No. 2004-123904
PTL 9: JP-A No. 05-239392
PTL 10: JP-A No. 08-283633
PTL 11: JP-A No. 2000-63727
PTL 12: JP-A No. 2001-81366
PTL 13: JP-A No. 2003-509571
PTL 14: JP-A No. 08-333531
PTL 15: JP-A No. 56-147871
PTL 16: U.S. Pat. No. 5,085,698
PTL 17: U.S. Pat. No. 5,221,334
PTL 18: U.S. Pat. No. 5,172,133
PTL 19: U.S. Pat. No. 5,571,311
PTL 20: JP-A No. 08-81646
PTL 21: JP-A No. 08-3498
PTL 22: JP-A No. 09-194775
PTL 23: JP-A No. 2000-144028
PTL 24: JP-A No. 2005-281691
PTL 25: JP-A No. 2005-314528
PTL 26: JP-A No. 2006-188626
PTL 27: Japanese Patent (JP-B) No. 3625595

SUMMARY OF INVENTION

Technical Problem

The present invention aims to provide techniques related to an inkjet recording ink set that provides a high image density and, at the same time, possesses excellent ejection stability and liquid stability, an ink cartridge including inks constituting the ink set housed therein, an inkjet recording device, and an inkjet recording method.

Solution to Problem

The above object can be attained by the following means.
The inkjet recording ink set, which contains:
a cyan ink;
a magenta ink;
a yellow ink; and
a black ink,
wherein the cyan ink, the magenta ink, the yellow ink, and the black ink each contain at least a pigment, a surfactant, water, a water-soluble organic solvent, and an anionic self-emulsifying ether-based polyurethane,
wherein each ink contains, as the pigment, a combination of a (i) pigment dispersion liquid, in which the pigment is dispersed in water with assistance of the surfactant, and a (ii) resinous polymer-coated pigment dispersion liquid, in which the pigment is coated with a resinous polymer, and the resinous polymer-coated pigment is dispersed in water, and
wherein the (i) pigment dispersion liquid and the (ii) resinous polymer-coated pigment dispersion liquid satisfy the following formula:

$|A-B| \leq 30$ nm where A is the average particle diameter (D50) of the dispersed pigment in the (i) pigment dispersion liquid, and B is the average particle diameter (D50) of the dispersed resinous polymer-coated pigment in the (ii) pigment dispersion liquid.

Advantageous Effects of Invention

The present invention can provide an inkjet recording ink set that provides a high image density and, at the same time, possesses excellent ejection stability and liquid stability, an ink cartridge including inks constituting the ink set housed therein, an inkjet recording device, and an inkjet recording method.

BRIEF DESCRIPTION OF DRAWING

FIG. 1 is a schematic view illustrating an example of an inkjet recording device according to the present invention.

DESCRIPTION OF EMBODIMENTS (Inkjet Recording Ink Set)
The inkjet recording ink set according to the present invention contains a cyan ink, a magenta ink, a yellow ink, and a black ink, wherein the cyan ink, the magenta ink, the yellow ink, and the black ink each contain at least a pigment, a surfactant, water, a water-soluble organic solvent, and an anionic self-emulsifying ether-based polyurethane, wherein each ink contains, as the pigment, a combination of a (i) pigment dispersion liquid, in which the pigment is dispersed in water with assistance of the surfactant, and a (ii) resinous polymer-coated pigment dispersion liquid, in which the pigment is coated with a resinous polymer, and the resinous polymer-coated pigment is dispersed in water, and wherein the (i) pigment dispersion liquid and the (ii) resinous polymer-coated pigment dispersion liquid satisfy the following formula:

$|A-B| \leq 30$ nm where A is the average particle diameter (D50) of the dispersed pigment in the (i) pigment dispersion liquid, and B is the average particle diameter (D50) of the dispersed resinous polymer-coated pigment in the (ii) pigment dispersion liquid.
It is important that $|A-B|$ be 30 nm or less, preferably 15 nm or less.
The cyan ink, the magenta ink, the yellow ink, and the black ink each are a dispersion liquid including dispersed particles therein, and the average particle diameter (D50) of the dispersed particles thereof is preferably 50 nm to 150 nm, more preferably 75 nm to 125 nm.
The average particle diameter (D50) may be measured, for example, by means of Microtrac UPA150 (manufactured by NIKKISO CO., LTD.).
The present inventors have proposed that image density, ejection stability, and liquid stability can be simultaneously realized by mixing a dispersion liquid in which a resinous polymer-coated pigment is dispersed in water, and a dispersion liquid in which a pigment is dispersed in water with assistance of a surfactant. However, it has been found that difficulties are encountered in simultaneously satisfying image density, ejection stability, and liquid stability due to the particle diameter of the dispersion liquid used.
In general, the pigment which has been dispersed with assistance of a surfactant to a high dispersion degree is less likely to settle, and, thus, the settling of the particles can be prevented, but on the other hand, permeation in paper occurs.

High image density, ejection stability, and liquid stability can be simultaneously realized by adding a dispersion liquid of a resinous polymer-coated pigment dispersed in water so as to meet a requirement of |A−B| of 30 nm or less. Bringing the particle diameters to the above-defined range can realize excellent color development and, in black, can realize high blackness in composite (dotting cyan, magenta, and yellow to yield black).

Note that, the pigment dispersion liquid in which the pigment is dispersed in water with assistance of the surfactant is referred to as a (i) pigment dispersion liquid, and the resinous polymer-coated dispersion liquid in which the pigment has been coated with a resinous polymer and the resinous polymer-coated pigment is dispersed in water is referred to as a (ii) resinous polymer-coated pigment dispersion liquid, hereinafter.

The average particle diameter A (D50) of the dispersed pigment in the (i) pigment dispersion liquid is preferably 50 nm to 200 nm, more preferably 100 nm to 150 nm.

The average particle diameter B (D50) of the dispersed resinous polymer-coated pigment in the (ii) resinous polymer-coated pigment dispersion liquid is preferably 50 nm to 200 nm, more preferably 100 nm to 150 nm.

When the average particle diameter A (D50) of the (i) pigment dispersion liquid is smaller than 50 nm, the dispersion stability is likely to be deteriorated. However, the image density, the ejection stability, and the liquid stability could be simultaneously realized without sacrificing the dispersion stability by using an anionic self-emulsifying ether-based polyurethane as the resin for the resin emulsion and a sodium naphthalene sulfonate-formalin condensate or a compound represented by the following general formula (1) as the surfactant.

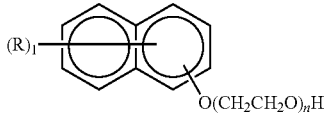

General Formula (1)

In the general formula (1), R represents a C1-C20 alkyl group, an allyl group, or an aralkyl group; 1 is an integer of 0 to 7; and n is an integer of 20 to 200.

In the present invention, the amount of the surfactant in the (i) dispersion liquid for the black ink is preferably 0.01 to 0.5 relative to 1 of the pigment on the weight basis. More preferably, the amount of the surfactant is 0.05 to 0.25 relative to 1 of the pigment on the weight basis. The use of the surfactant in the above-defined amount range can allow the average particle diameter (D50) of the black ink dispersion liquid to be brought to the above-defined range, and, thus, the resulting inkjet recording ink can be provided that can realize higher image density, ejection stability, and liquid stability.

When the amount of the surfactant is less than 0.01, the above effect is less likely to be attained and, further, the storage stability of the pigment dispersion liquid and the ink is poor. Consequently, clogging of nozzles is likely to occur. On the other hand, when the amount of the surfactant is more than 0.5, the viscosity of the pigment dispersion liquid and the ink is so high that printing by an inkjet recording method is likely to be difficult.

Preferably, a sodium naphthalene sulfonate-formalin condensate is used as the surfactant in the black ink, and the total amount of dimers, trimers, and tetramers of naphthalene sulfonic acid in the sodium naphthalene sulfonate-formalin condensate is 20% by mass to 80% by mass. The total amount of dimers, trimers, and tetramers of naphthalene sulfonic acid in the sodium naphthalene sulfonate-formalin condensate of less than 20% by mass is disadvantageous in that the dispersibility is lowered and the storage stability of the dispersion and the ink is poor. Consequently, clogging of nozzles is likely to occur.

When the total amount of dimers, trimers, and tetramers of naphthalene sulfonic acid in the sodium naphthalene sulfonate-formalin condensate is more than 80% by mass, the viscosity is increased, whereby the dispersion becomes difficult.

In the color inks such as cyan, magenta, and yellow inks, the amount of the surfactant in the (i) pigment dispersion liquid is preferably 0.3 to 2.0, more preferably 0.5 to 2.0, relative to 1 of the pigment on the weight basis. Bringing the amount of the surfactant to the range of 0.3 to 2.0 can realize the provision of an ink liquid having a small average particle diameter or having a small standard deviation in a particle size distribution. When the ratio of the surfactant relative to the pigment is less than 0.3, the ink liquid has a large average particle diameter or a large standard deviation in the particle size distribution and, thus, a satisfactory chroma cannot be obtained. On the other hand, when the ratio of the surfactant relative to the pigment is more than 2.0, the viscosity of the ink is so high that printing by an inkjet recording method is likely to be difficult.

The surfactant contained in each color ink for use in the present invention may be any surfactant. However, the use of a compound represented by general formula (1) can realize the provision of inkjet recording inks having a small average particle diameter or having a small standard deviation in a particle size distribution.

In the surfactant (i.e. a dispersant) represented by general formula (1), n is an integer of 20 to 200, preferably 20 to 100, more preferably 30 to 50. An n value of less than 20 is likely to cause lowered dispersion stability and provides an ink liquid having a large average particle diameter or a large standard deviation in a particle size distribution, and, thus, a satisfactory chroma cannot be obtained. On the other hand, n is more than 200, the viscosity of the ink is so high that printing by an inkjet recording method is likely to be difficult.

A compound represented by general formula (2) is preferred as the compound represented by general formula (1). POE (n=40) β-naphthyl ether is more preferred.

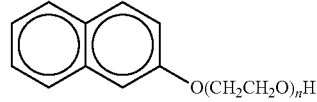

General Formula (2)

In the general formula (2), n is an integer of 20 to 100.

The (i) pigment dispersion liquid in which the pigment is dispersed in water with assistance of the surfactant is obtained by dispersing a pigment, a surfactant, water, and optionally various additives such as wetting agents (for example, PIONIN A-51-B manufactured by Takemoto Oil & Fat Co., Ltd.) with a disperser, for example, a bead mill such as DYNO-MILL (Model KDL, manufactured by SHINMARU ENTERPRISES CORPORATION), AGITATOR MILL LMZ (manufactured by ASHIZAWA FINETECH LTD.), or SC MILL (manufactured by MITSUI MINING CO., LTD.) and further after dispersion with a bead mill performing dispersion with a beadless mill, for example, high-speed shear force-type mill CLEAR SS5 (manufactured by M TECHNIQUE Co., Ltd.), Cabitron CD1010 (manufactured by Euro Tech), module DR2000 (manufactured by SHINMARU ENTERPRISES CORPORATION), thin-film swivel type T.K. FILMIX (manufactured by PRIMIX Corporation), ultrahigh-pressure collision-type Artimizer (manufactured by Sugino Machine Co., Ltd.), or Nanomizer (manufactured by YOSHIDA KIKAI Co. Ltd.).

Pretreatment of coarse particles by homogenizers or the like in a step before the treatment with the disperser can realize a sharper particle size distribution, leading to improved image density, ejection stability and the like.

The dispersion liquid thus obtained is particularly suitable for use as pigment inks for inkjet recording.

Beads usable in the present invention are usually ceramic beads. Zirconia beads are generally used. The diameter of the beads is preferably 0.05 mm or less, more preferably 0.03 mm or less.

In the present invention, carbon black used as the pigment in the black ink preferably has a small average primary particle diameter. When the average primary particle diameter is small, the particles are high structure particles that are weak against impulsion during the dispersion. On the other hand, when the bead diameter is more than 0.05 mm, the collision energy among the beads is so strong that the structure is broken, resulting in lowered stability of the resultant carbon black pigment dispersion liquid. For this reason, the bead diameter is preferably 0.05 mm or less.

Further, in the present invention, the ink is characterized that the ink is obtained by mixing (including a combination of) the (i) pigment dispersion liquid in which the pigment is dispersed in water with assistance of the surfactant with the (ii) resinous polymer-coated pigment dispersion liquid in which the pigment has been coated with a resinous polymer and dispersed in water. The resinous polymer-coated pigment dispersion liquid in which the pigment has been coated with a resinous polymer and dispersed in water is generally called an encapsulated pigment and is obtained by coating a pigment with a hydrophilic water-insoluble resin to render the surface of the pigment hydrophilic with the resin layer on the surface of the pigment to allow the pigment to be dispersible in water.

Preferably, the resinous polymer-coated pigment dispersion liquid in which the pigment has been coated with a resinous polymer and dispersed in water is produced, for example, by a process in which a resin having an acid value is provided and is neutralized with a base to prepare a self-water dispersible resin that is used as a film forming resin. Resins having an acid value include, for example, resins having an acid value of 50 to 180. The acid value refers to the number of milligrams (mg) of potassium hydroxide (KOH) necessary for neutralizing 1 g of the resin and is expressed in terms of mg·KOH/g (the unit will be omitted hereinafter). Such resins may be obtained, for example, by neutralizing the whole or a part of the acid value of the resins having the above specific value. In this case, preferably, the acid value is neutralized so that the pH value of the ink is brought to 7.5 to 9.0.

When the acid value is less than 50, the hydrophilicity of the surface of microcapsule particles is low and is likely to cause unsatisfactory dispersion stability. On the other hand, when the acid value exceeds 180, the hydrophilicity of the resin is disadvantageously so high that the coating of the pigment with the resin is likely to be unsatisfactory due to swelling or the like and coagulation among microcapsule particles or nozzle clogging is likely to occur, and, thus, the use of this resin is unsuitable.

An optimal construction that offers a significant effect in the ink for inkjet recording in the present invention is that, in preparing an ink containing 0.01% by mass to 2% by mass of a film forming resin ingredient dissolved therein, a resin having an acid value of 50 to 180 is provided and is neutralized with a base to prepare a film forming resin that is used as the film forming resin and, further, the pH value of the ink is brought to 7.5 to 9.0.

The molecular weight range of the film forming resin is not particularly limited but is preferably 1,000 to 100,000 in terms of weight average molecular weight. When the molecular weight of the film forming resin is less than 10,000, in many cases, satisfactory film formation cannot be provided and nozzle clogging disadvantageously occurs, for example, due to coagulation among microcapsule particles and, thus, this molecular weight is unsuitable. In particular, in order to satisfactorily coat the pigment with the film forming resin, the molecular weight of the resin is preferably 10,000 to 100,000.

Preferred film forming resins used in the present invention are styrene resins or (meth)acrylic resins, and an example thereof is a self-water dispersible resin prepared by neutralizing, with a base, at least a part of a copolymer of at least one monomer selected from the group of styrene, substituted styrene, and (meth)acrylic acid esters with (meth)acrylic acid.

(Meth)acrylic acid is a collective term of acrylic acid and methacrylic acid, and, in the present invention, any one of them is indispensable. More suitable film forming resins have a structure derived from both acrylic acid and methacrylic acid.

In inks for inkjet recording formed using a pigment dispersion liquid produced in the present invention, that is, a resinous polymer-coated pigment dispersion liquid in which the pigment has been coated with a resinous polymer and dispersed in water, for example, in order to lower the level of dissolution of the self-water dispersible resin as the film forming resin in an aqueous medium, the proportion of acrylic acid relative to methacrylic acid in all the carboxyl group-containing monomer ingredients may be increased.

The self-water dispersible resin as the optimal film forming resin is a self-water dispersible resin obtained by neutralizing, with a base, at least a part of an acrylic acid-methacrylic acid copolymer which is composed mainly of at least one monomer selected from styrene, substituted styrenes, and (meth) acrylic acid esters and in which the proportion of methacrylic acid copolymerized is higher than that of acrylic acid copolymerized.

In order to render the pH value of the final ink basic, the resin that can be rendered dispersible in an aqueous medium by neutralization may be neutralized, that is, a base may be added to the resin. Bases usable herein include, for example, hydroxides of alkali metals such as sodium hydroxide, potassium hydroxide, and lithium hydroxide; basic substances such as ammonia, triethylamine, and morpholine; and alcohol amines such as triethanol amine, diethanol amine, and N-methyl diethanol amine. When a resin having a higher acid value is neutralized with a stronger base while dissolving the resin at an elevated temperature that does not decompose the film forming resin, the solubility of the film forming resin in inks is further increased. Accordingly, preferably, the strength and amount (neutralization degree) of the base used are regulated. In inkjet recording, an alcohol amine that is a weak base, particularly triethanol amine, is an optimal base because it hardly adversely affects nozzle clogging, dispersion stability during storage, and waterfastness of printed matters.

In the present invention, the degree of neutralization of acid groups in the film forming resin is a level corresponding to 100% by mole or less, preferably 60% by mole or less. Particularly preferably, the acid groups in the film forming resin are neutralized with an alcohol amine as the base to a neutralization degree of 60% by mole or less.

In the (i) pigment dispersion liquid and the (ii) resinous polymer-coated pigment dispersion liquid, the concentration of the pigment is preferably 5% by mass to 50% by mass based on the total mass of the dispersion. When the concentration of the pigment is less than 5% by mass, the productivity is low. On the other hand, when the concentration of the pigment is more than 50% by mass, the viscosity of the pigment dispersion is so high that the dispersion is likely to be difficult.

Water is preferred as a dispersion medium for the pigment dispersion. If necessary, water-soluble organic solvents which will be described later may be used in combination with water.

In ink preparation, the mixing ratio (surfactant-dispersed pigment/capsule pigment) of the (i) pigment dispersion liquid in which the pigment is dispersed in water with assistance of the surfactant (surfactant-dispersed pigment) to the (ii) resinous polymer-coated pigment dispersion liquid in which the resinous polymer-coated pigment is dispersed in water (capsule pigment) is preferably 99/1 to 1/99, more preferably 99/1 to 40/60, particularly preferably 99/1 to 50/50.

Examples of the pigment for use in the black ink include carbon black.

Specific examples of carbon black include: #10B, #20B, #30, #33, #40, #44, #45, #45L, #50, #55, #95, #260, #900, #1000, #2200B, #2300, #2350, #2400B, #2650, #2700, #4000B, CF9, MA8, MA11, MA77, MA100, MA220, MA230, MA600, and MCF88, manufactured by Mitsubishi Chemical Corporation; MONARCH 120, MONARCH 700, MONARCH 800, MONARCH 880, MONARCH 1000, MONARCH 1100, MONARCH 1300, MONARCH 1400, MOGUL L, REGAL 99R, REGAL 250R, REGAL 300R, REGAL 330R, REGAL 400R, REGAL 500R, and REGAL 660R, manufactured by Cabot Corporation; and NIPEX150, PRINTEX A, PRINTEX G, PRINTEX U, PRINTEX V, PRINTEX 55, PRINTEX 140U, PRINTEX 140V, SPECIAL BLACK 4, SPECIAL BLACK 4A, SPECIAL BLACK 5, SPECIAL BLACK 6, SPECIAL BLACK 100, SPECIAL BLACK 250, COLOR BLACK FW1, COLOR BLACK FW2, COLOR BLACK FW2V, COLOR BLACK FW18, COLOR BLACK FW200, COLOR BLACK S150, COLOR BLACK S160, and COLOR BLACK 5170, manufactured by Degussa.

Preferably, the carbon black has an average primary particle diameter of 10.0 nm to 30.0 nm and a BET surface area of 100 $m^2/g$ to 400 $m^2/g$. More preferably, the carbon black has an average primary particle diameter of 15.0 nm to 20.0 nm and a BET surface area of 150 $m^2/g$ to 300 $m^2/g$.

Examples of the magenta pigment include PIGMENT RED 5, PIGMENT RED 7, PIGMENT RED 12, PIGMENT RED 48 (Ca), PIGMENT RED 48 (Mn), PIGMENT RED 57 (Ca), PIGMENT RED 57:1, PIGMENT RED 112, PIGMENT RED 122, PIGMENT RED 123, PIGMENT RED 168, PIGMENT RED 184, PIGMENT RED 202, and PIGMENT VIOLET 19.

Examples of the Cyan pigment include PIGMENT BLUE 1, PIGMENT BLUE 2, PIGMENT BLUE 3, PIGMENT BLUE 15, PIGMENT BLUE 15:3, PIGMENT BLUE 15:4, PIGMENT BLUE 16, PIGMENT BLUE 22, PIGMENT BLUE 60, VAT BLUE 4, and VAT BLUE 60.

Examples of the yellow pigment include PIGMENT YELLOW 1, PIGMENT YELLOW 2, PIGMENT YELLOW 3, PIGMENT YELLOW 12, PIGMENT YELLOW 13, PIGMENT YELLOW 14, PIGMENT YELLOW 16, PIGMENT YELLOW 17, PIGMENT YELLOW 73, PIGMENT YELLOW 74, PIGMENT YELLOW 75, PIGMENT YELLOW 83, PIGMENT YELLOW 93, PIGMENT YELLOW 95, PIGMENT YELLOW 97, PIGMENT YELLOW 98, PIGMENT YELLOW 114, PIGMENT YELLOW 120, PIGMENT YELLOW 128, PIGMENT YELLOW 129, PIGMENT YELLOW 138, PIGMENT YELLOW 150, PIGMENT YELLOW 151, PIGMENT YELLOW 154, PIGMENT YELLOW 155, and PIGMENT YELLOW 180.

In the present invention, the following surfactant may be used in combination with the aforementioned materials in such an amount that does not adversely affect the obtainable properties of the resulting ink.

Specifically, nonionic surfactants are available as BT series (manufactured by Nikko Chemicals Co., Ltd.), NONIPOL series (manufactured by Sanyo Chemical Industries, Ltd.), D- and P-series (manufactured by Takemoto Oil & Fat Co., Ltd.), SURFYNOL series (manufactured by AIR PRODUCTS), OLFINE series (manufactured by Nissin Chemical Industry Co., Ltd.), EMALEX DAPE series (manufactured by Nihon-Emulsion Co., Ltd.), silicone-based surfactants (manufactured by Dow Corning Toray Co., Ltd.), and fluoro surfactants (manufactured by Neos Co., Ltd., Sumitomo 3M Ltd., and DuPont Co., and Daikin Industries, Ltd.).

The ink for inkjet recording may be obtained by publicly known methods, for example, by mixing the (i) pigment dispersion liquid in which the pigment is dispersed in water with assistance of a surfactant, the (ii) resinous polymer-coated pigment dispersion liquid in which the resinous polymer-coated pigment is dispersed in water, water, the water soluble organic solvent, and the anionic self-emulsifying ether polyurethane resin emulsion with stirring, removing coarse particles by filtration with a filter, a centrifugal separator or the like and optionally degassing the filtrate.

The concentration of the pigment in the ink is 1% by mass to 20% by mass based on the total mass of the ink. When the concentration of the pigment is less than 1% by mass, the image density is so low that the sharpness of the print is low. On the other hand, the concentration of the pigment is more than 20% by mass, the viscosity of the ink is likely to be high and, at the same time, is likely to cause nozzle clogging.

If necessary, the same materials as described in connection with additives to the dispersion may be incorporated in inks for inkjet recording.

For example, the amount of the water soluble organic solvent is 0% by mass to 50% by mass, preferably 5% by mass to 40% by mass, more preferably 10% by mass to 35% by mass based on the total mass of the ink.

Examples of the water soluble organic solvent for use in the present invention include, but are not limited to, polyhydric alcohols such as ethylene glycol, diethylene glycol, 1,3-butyl glycol, 3-methyl-1,3-butyl glycol, triethylene glycol, polyethylene glycol, polypropylene glycol, 1,5-pentanediol, 1,6-hexanediol, glycerin, 1,2,6-hexanetriol, 2-ethyl-1,3-hexanediol, ethyl-1,2,4-butanetriol, 1,2,3-butanetriol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxy ethyl-2-pyrrolidone, 1,3-dimethylimidazolidinone, ε-caprolactam, and γ-butyrolactone; amides such as formamide, N-methyl formamide, and N,N-dimethyl formamide; amines such as monoethanolamine, diethanolamine, triethanolamine, monoethylamine, diethylamine, and triethylamine; sulfur-containing compounds such as dimethylsulfoxide, sulfolane, and thiodiethanol; and carbonates such as propylene carbonate and ethylene carbonate.

Among them, 1,3-butyl glycol, diethylene glycol, triethylene glycol and/or glycerin are preferred because the presence of them in the ink can offers excellent effects of the prevention of clogging attributable to ink drying, that is, the prevention of a failure of inkjetting caused by water evaporation and improved density of formed images in the present invention.

In the present invention, it has been found that the incorporation of 2-ethyl-1,3-hexanediol (EHD) can increase the permeability of the ink and, at the same time, can allow the pigment to stay on the surface of the recording medium to eliminate feathering or bleeding, whereby printed images having high image density and little or no strike-through can be obtained, and, further, a combination of the incorporation of the EHD with the pigment mixture system can offer an additional effect of improved ejection stability.

The amount of EHD is preferably 0.1% by mass to 10.0% by mass, more preferably 1.5% by mass to 5.0% by mass. When the amount of EHD is less than 0.1% by mass, the effect is small. On the other hand, the amount of EHD is more than 10.0% by mass, the reliability is lowered because EHD per se has low solubility.

Further, in the present invention, the ink is characterized by containing an anionic self-emulsifying ether polyurethane resin. Preferably, the addition of the anionic self-emulsifying ether polyurethane resin in an emulsion form is preferred.

Examples of resin emulsions added to the ink for inkjet recording include styrene acrylic resins, acrylsilicone resins, and polyurethane resins. Among them, polyurethane resins are particularly preferred. Two or more types of resin emulsions may be used in combination. The use of a proper combination of resins emulsions can realize improved image and image fastness properties while ensuring storage stability of the ink.

The average particle diameter (D50) of the resin in the anionic self-emulsifying ether polyurethane resin emulsion is preferably 200 nm or less, more preferably 100 nm or less.

The anionic self-emulsifying ether polyurethane resin advantageously has a property of thickening or agglomerating ink upon impact on a recording medium such as paper, can suppresses the penetration of colorant ingredients, and further can accelerates the fixation of the colorant ingredients on the paper. Further, as compared with other resins, the anionic self-emulsifying ether polyurethane resin has a better effect of forming a film on paper and improving fastness to rubbing of printed matter. Further, the addition of the anionic self-emulsifying ether polyurethane resin can improve the dispersion stability of the pigment. The amount of the anionic self-emulsifying ether polyurethane resin in the ink for inkjet recording is preferably 0.1% by mass to 20% by mass, more preferably 0.2% by mass to 10% by mass in terms of resin solid content. When the amount is less than 0.1% by mass, the amount of the resin covering the pigment after the impact of the ink on the recording medium is unsatisfactory, resulting in lowered fastness to rubbing. On the other hand, when the amount is more than 20% by mass, the viscosity of the ink is so high that printing by an inkjet recording method is likely to be difficult.

Next, the anionic self-emulsifying ether urethane resin used in the present invention will be described. The urethane resin as used herein refers to a polymer including a main chain having, as a main skeleton, a polyurethane skeleton that contains urethane bonds connected to each other In the present invention, among urethane resins, water-dispersible urethane resins are particularly preferred. Such water-dispersible urethane resins are generally a water dispersion liquid of polyurethane obtained by the introduction of a hydrophilic component necessary for stable dispersion in water into the main chain of the polyurethane skeleton or by dispersion with assistance of an external emulsifier. Among them, self-dispersible (self-emulsifying) urethane resins containing a hydrophilic component introduced into the main chain are used. The form thereof may be any of colloidal dispersion, emulsion, suspension, and slurry.

Among various water-dispersible urethane resins (for example, ester urethane resins, ether urethane resins, and carbonate urethane resins) obtained by reacting a diisocyanate compound, a diol compound such as a polyether diol, a polyester diol, or a polycarbonate diol, and an acid group-containing diol such as a carboxylic acid or sulfonic acid group, anionic self-emulsifying ether urethane resins are particularly used as the urethane resin in the present invention.

Such diisocyanates include, for example, aliphatic diisocyanate compounds such as hexamethylene diisocyanate and 2,2,4-trimethylhexamethylene diisocyanate; alicyclic diisocyanate compounds such as isophorone, diisocyanate, hydrogenated xylylene diisocyanate, 1,4-cyclohexane diisocyanate, and 4,4'-dicyclohexylmethanediisocyanate; aliphatic diisocyanate compounds such as xylylene diisocyanate and tetramethylxylene diisocyanate; aromatic diisocyanate compounds such as toluoylene diisocyanate, and phenylmethane diisocyanate; and modification products of these diisocyanates (for example, carbodimide-, urethodione-, and urethoimine-containing modification products).

Such diol compounds include, for example, polyether glycols such as polyethylene glycol, polypropyleneglycol, polytetramethylene ether glycol, and polyhexamethylene ether glycol; polyester diols such as polyethylene adipate, polybutylene adipate, polyneopentyl adipate, poly-3-methylpentyl adipate, polyethylene/butylene adipate, and polyneopentyl/hexyl adipate; polylactone diols such as polycaprolactone diols; and polycarbonate diols. Polyether, polyester, and polycarbonate diol compounds are preferred from the viewpoint of the storage stability of the ink. Polyether or polycarbonate diol compounds are more preferred. Polyether diol compounds are still more preferred. Polyether and polycarbonate diol compounds can offer good storage stability because of low susceptibility to a deterioration caused by hydrolysis in water.

Such acid group-containing diols include, for example, dimethylol acetic acid, dimethylol butanoic acid, dimethylol propionic acid, and dimethylol butyric acid. Dimethylol butanoic acid is particularly preferred.

The urethane resin may be synthesized by various known methods, and examples thereof include, but are not limited to, a solution method that includes synthesizing a diisocyanate-terminal prepolymer in a low boiling solvent (for example, acetone) inert to an isocyanate group, introducing a hydrophilic group using a diamine or a polyol, then diluting the product with water for phase conversion, and removing the solvent by distillation to obtain a polyurethane dispersion, a prepolymer method that includes firstly synthesizing an inso-cyanate-terminal prepolymer with a hydrophilic group introduced thereinto, dispersing the product in water, and then performing chain extension with an amine, other hot melt methods, a method in which a uretheane prepolymer is subjected to chain extension in an aqueous emulsifier solution using water, which is a medium, as a chain extender, a method including a step of sulfonating an aromatic ring in a urethane prepolymer that contains a free isocyanate group and is obtained from a hydrophobic polyol and an aromatic polyisocyanate, and a method using a blocked isocyanate.

In particular, the urethane resin may be synthesized by the prepolymer method. In the prepolymer method, a low-molecular weight polyhydroxy compound may be used. Such low-molecular weight polyhydroxy compounds include compounds mentioned above as starting compounds for polyester diols, that is, glycol and alkylene oxide low mole adducts, trihydric alcohols such as glycerin, trimethylolethane, and trimethylolpropane, and alkylene oxide low mole adducts thereof.

For aqueous urethane resins, it is common practice to adopt a method that includes subjecting a urethane prepolymer prepared in an organic solvent phase to phase convention/emulsification and further subjecting the prepolymer to chain extension in an aqueous phase. General chain extenders usable herein are polyamines such as diamines. Specifically, the dimethylol alkanoic acid-derived acid groups in the urethane prepolymer are neutralized, followed by chain extension with water or di- or triamine. Polyamines usable as chain extenders in the extension with an amine are usually diamines or triamines. Specific examples thereof include hexamethylenediamine, isophoronediamine, hydrazine, and piperazine.

However, it has been found that, when a urethane resin obtained using a polyamine as the chain extender is used, the storage stability of the recording liquid is likely to be poor. The reason for this is believed to reside in that the urethane resin subjected to chain extension with the amine (a polyurethane resin including a polyurethane urea moiety) is likely to be hydrolyzed and, further disadvantageously, the polyamine produced by the hydrolysis functions as a coagulating agent in a pigment-dispersed recording liquid, that is, the urethane resin subjected to chain extension with the amine has a double adverse effect.

The urethane resin may be used in the form of salts of alkali metals such as lithium (Li), sodium (Na), and potassium (K) or salts of organic amines such as ammonia, dimethylamine, (mono-, di-, or tri-) ethanolamines. These salts may be obtained by neutralizing the urethane resin obtained by the above method. The base usable in the neutralization may be properly selected, for example, according to counter ions of desired salts. Examples thereof include alkylamines such as buthylamine and triethylamine; alkanolamines such as monoethanolamine, diethanolamine, and triethanolamine; morpholine; ammonia; and inorganic bases such as sodium hydroxide.

The acid value of the free acid of the anionic self-emulsifying ether polyurethane resin used in the present invention is preferably 40 or more, more preferably 60 or more, particularly preferably 70 or more, from the viewpoint of further enhancing the storage stability and ejection stability of the recording liquid. The upper limit of the acid value is preferably 120 or less, more preferably 100 or less, particularly preferably 90 or less. When the acid value is less than 40, the ink is insoluble in water, resulting in poor storage stability of the ink. On the other hand, when the acid value is more than 120, problems sometimes occur including lowered fastness to rubbing and waterfastness of the coating film and high viscosity that causes deteriorated ejection. The weight average molecular weight of the polymer is generally preferably 30,000 or less, particularly preferably 20,000 or less, from the viewpoint of ejection stability. When the molecular weight is high, the viscosity is increased, making it difficult to eject the ink. On the other hand, when the molecular weight is less than 10,000, the urethane resin is likely to be rendered highly soluble in water and, at the same time, the effect of imparting gloss is lowered. The liquid stability is also likely to be low.

It is known that, when carbon black is dispersed together with the anionic self-emulsifying ether polyurethane resin, the stability of the dispersion is better than that of a dispersion prepared by the sole use of the carbon black. The reason for this has not been elucidated yet but is believed to reside in that the urethane resin surrounds the carbon black and serves as protective colloid. It has been found that, for the formation of optimal protective colloid, a relationship between the amount of the acid group on the surface of the carbon black and the functional group of the urethane resin should be satisfied.

In the ink for inkjet recording according to the present invention, it is considered that the colorant and the water insoluble resin contained in the ink are dried and, consequently, are disadvantageously fixed to a silicone resin-containing ink-repellent layer. Since, however, the anionic self-emulsifying ether polyurethane resin is present and, further, a cushioning effect exists between the silicone resin-containing ink-repellent layer and the ink, the releasability is good, whereby the fixation to a nozzle plate can be prevented and the ejection stability can be improved.

Further, in addition to water, various additives may be incorporated in the ink for inkjet recording according to the present invention. Examples thereof include water soluble organic media, for example, alcohols such as methanol, ethanol, 1-propanol, and 2-propanol, polyhydric alcohols such as ethylene glycol, diethylene glycol, triethylene glycol, propylene glycol, and glycerin, pyrrolidone derivatives such as N-methylpyrrolidone and 2-pyrrolidone; ketones such as acetone and methyl ethyl ketone, alkanol amines such as monoethanol amine, diethanol amine, and triethanol amine; various surfactants such as nonionic, anionic, cationic, and amphoteric surfactants; and preservatives.

The ink for inkjet recording thus obtained can ensure water retention and wetting properties and, consequently, even when stored for a long period of time, is free from coagulation of colorants and an increase in viscosity and, thus, can realize excellent storage stability. Further, even when the ink for inkjet recording is allowed to stand in an exposed state, for example, at a front end of a nozzle of an inkjet printer, the dried product of the ink can be kept flowable for a long period of time. Further, clogging during printing or at the time of restart after interruption of printing can does not occur, and high ejection stability can be realized.

The ink for inkjet recording according to the present invention thus obtained is suitable for use in an ink cartridge in which the ink is housed. Further, the ink for inkjet recording according to the present invention may be ejected with an inkjet printing apparatus on an image support such as paper to perform recording (printing) and thus to form an image.

Printing methods include continuous jetting or on-demand methods. On-demand methods include piezo, thermal, and electrostatic methods.

The inkjet recording method and an example of the inkjet recording device according to the present invention will be explained with reference to the accompanying drawing.

In FIG. 1, an inkjet recording device 1 is loaded with a cartridge 20 in which inks are stored. The inks are fed into a recording head from the cartridge. Inks of respective colors are stored separately from each other in the cartridge 20.

The recording head is loaded on a carriage 18 and is moved by a timing belt 23 driven by a main scanning motor 24 while being guided by guide shafts 21, 22. On the other hand, a recording material is placed by a platen at a position that faces the recording head.

The inkjet recording device can be supplemented with inks by replacing the cartridge. The cartridge may be one integrated with the recording head.

Publicly known techniques concerning the technical field of the present invention, those described, for example, in Japanese Patent Application Laid-Open (JP-A) No. 2000-198958, may be properly adopted in the formation of the ink cartridge, the formation of the inkjet recording device, and the inkjet recording method.

EXAMPLES

The present invention will be described with reference to the following Examples. However, it should be noted that the present invention is not limited to these Examples. Parts in the Examples denote parts by mass.

In the Examples, as for the measurement of the average particle diameter of the dispersed elements in each dispersion, the volume average particle diameter (median particle size (D50), unit: nm) thereof was measured by means of Microtrac UPA150 (manufactured by NIKKISO CO., LTD.) under the following conditions:

Measurement solution: 0.1% by mass aqueous solution
[Conditions]
  Part Refractive Index: 1.86
  Part Density: 1.86 (g/cm$^3$)
  Fluid Refractive Index: 1.33
Preparation of Black Pigment Dispersion Liquid Using Surfactant Dispersion Liquid (A)
Formulation

| | |
|---|---|
| Pigment: NIPEX150 (gas black, manufactured by Degussa) | 200 parts |
| Sodium naphthalene sulfonate-formalin condensate (PIONION A-45-PN manufactured by Takemoto Oil & Fat Co., Ltd.) (Total amount of dimers, trimers, and tetramers of naphthalenesulfonic acid: 30% by mass) | 50 parts |
| Distilled water | 750 parts |

The mixture was premixed and was then dispersed with a bead mill disperser (UAM-015 manufactured by KOTOBUKI INDUSTRIES CO., LTD.) using zirconia beads (density: 6.03×10$^{-6}$ g/m$^3$) having a diameter of 0.03 mm under conditions of a peripheral velocity of 10 m/s, a liquid temperature of 30° C., and a dispersion time of 15 min. Coarse particles were centrifuged with a centrifugal separator (Model-3600 manufactured by KUBOTA CORPORATION) to obtain a dispersion liquid (A) having an average particle diameter of 110 nm as a black pigment dispersion liquid using a surfactant.
Preparation of Resinous Polymer-Coated Black Pigment Dispersion Liquid
Dispersion Liquid (B)

The interior of a 1-L flask equipped with a mechanical stirrer, a thermometer, a nitrogen gas introduction tube, a reflux tube, and a dropping funnel was satisfactorily replaced by nitrogen gas. The flask was charged with 11.2 g of styrene, 2.8 g of acrylic acid, 12.0 g of lauryl methacrylate, 4.0 g of polyethylene glycol methacrylate, 4.0 g of styrene macromer (trade name: AS-6 manufactured by Toa Gosei Chemical Industry Co., Ltd.), and 0.4 g of mercapto ethanol, and the temperature of the flask was raised to 65° C. A liquid mixture including 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (trade name: AS-6 manufactured by Toa Gosei Chemical Industry Co., Ltd.), 3.6 g of mercapto ethanol, 2.4 g of azobisdimethylvaleronitrile, and 18 g of methyl ethyl ketone was then added dropwise into the flask over a period of 2.5 hr. After the completion of the dropwise addition, a mixed solution composed of 0.8 g of azobisdimethylvaleronitrile and 18 g of methyl ethyl ketone was added dropwise into the flask over a period of 0.5 hr. The mixture was aged at 65° C. for 1 hr. To the resultant, 0.8 g of azobisdimethylvaleronitrile was then added, and the resulting mixture was aged for additional 1 hr. After the completion of the reaction, 364 g of methyl ethyl ketone was added into the flask to prepare 800 g of a polymer solution having a concentration of 50% by mass.

The polymer solution synthesized above (28 g), 26 g of NIPEX150 (gas black manufactured by Degussa), 13.6 g of a 1 mol/L potassium hydroxide solution, 20 g of methyl ethyl ketone, and 30 g of ion exchanged water were satisfactorily stirred, and the mixture was then kneaded with a three-roll mill. The resultant paste was introduced into 200 g of ion exchanged water, and the mixture was satisfactorily stirred. Methyl ethyl ketone and water were removed by distillation with an evaporator. The residue was premixed and was then dispersed with a bead mill disperser (UAM-015 manufactured by KOTOBUKI INDUSTRIES CO., LTD.) using zirconia beads (density: 6.03×10$^{-6}$ g/m$^3$) having a diameter of 0.03 mm under conditions of a peripheral velocity of 10 m/s, a liquid temperature of 30° C., and a dispersion time of 15 min. Coarse particles were centrifuged with a centrifugal separator (Model-3600 manufactured by KUBOTA CORPORATION) to obtain a dispersion liquid (B) having an average particle diameter of 125 nm as a resinous polymer-coated black pigment dispersion liquid.
Preparation of Cyan Pigment Dispersion Liquid Using Surfactant Dispersion Liquid (C)
Formulation

| | |
|---|---|
| Pigment: Pigment Blue 15:3 (Cyanin Blue A-385 manufactured by Dainichiseika Color & Chemicals Manufacturing Co., Ltd.,) | 200 parts |
| Compound of general formula (2) (n = 40) | 56 parts |
| PIONION A-51-B (manufactured by Takemoto Oil & Fat Co., Ltd.) | 2.5 parts |
| Distilled water | 742 parts |

The mixture was premixed and was then dispersed with a bead mill disperser (UAM-015 manufactured by KOTOBUKI INDUSTRIES CO., LTD.) using zirconia beads (density: 6.03×10$^{-6}$ g/m$^3$) having a diameter of 0.03 mm under conditions of a peripheral velocity of 10 m/s, a liquid temperature of 30° C., and a dispersion time of 15 min. Coarse particles were centrifuged with a centrifugal separator (Model-3600 manufactured by KUBOTA CORPORATION) to obtain a dispersion liquid (C) having an average particle diameter of 80 nm as a cyan pigment dispersion liquid using a surfactant.
Preparation of Resinous Polymer-Coated Cyan Pigment Dispersion Liquid
Dispersion Liquid (D)

The interior of a 1-L flask equipped with a mechanical stirrer, a thermometer, a nitrogen gas introduction tube, a reflux tube, and a dropping funnel was satisfactorily replaced by nitrogen gas. The flask was charged with 11.2 g of styrene, 2.8 g of acrylic acid, 12.0 g of lauryl methacrylate, 4.0 g of polyethylene glycol methacrylate, 4.0 g of styrene macromer (trade name: AS-6 manufactured by Toa Gosei Chemical Industry Co., Ltd.), and 0.4 g of mercapto ethanol, and the temperature of the flask was raised to 65° C. A liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (trade name: AS-6 manufactured by Toa Gosei Chemical Industry Co., Ltd.), 3.6 g of mercapto ethanol, 2.4 g of azobisdimethylvaleronitrile, and 18 g of methyl ethyl ketone was then added dropwise into the flask over a period of 2.5 hr. After the completion of the dropwise addition, a mixed solution composed of 0.8 g of azobisdimethylvaleronitrile and 18 g of methyl ethyl ketone was added dropwise into the flask over a period of 0.5 hr. The mixture was aged at 65° C. for 1 hr. To the resultant, 0.8 g of azobisdimethylvaleronitrile was then added, and the resulting mixture was aged for additional 1 hr. After the completion of the reaction, 364 g of methyl ethyl ketone was added into the flask to prepare 800 g of a polymer solution having a concentration of 50% by mass.

The polymer solution synthesized above (28 g), 26 g of Pigment Blue 15:3 (Cyanin Blue A-385 manufactured by Dainichiseika Color & Chemicals Manufacturing Co., Ltd.), 13.6 g of a 1 mol/L potassium hydroxide solution, 20 g of methyl ethyl ketone, and 30 g of ion exchanged water were satisfactorily stirred, and the mixture was then kneaded with a three-roll mill. The resultant paste was introduced into 200 g of ion exchanged water, and the mixture was satisfactorily stirred. Methyl ethyl ketone and water were removed by distillation with an evaporator. The residue was premixed and was then dispersed with a bead mill disperser (UAM-015 manufactured by KOTOBUKI INDUSTRIES CO., LTD.) using zirconia beads (density: $6.03\times10^{-6}$ g/m$^3$) having a diameter of 0.03 mm under conditions of a peripheral velocity of 10 m/s, a liquid temperature of 30° C., and a dispersion time of 15 min. Coarse particles were centrifuged with a centrifugal separator (Model-3600 manufactured by KUBOTA CORPORATION) to obtain a dispersion liquid (D) having an average particle diameter of 100 nm as a resinous polymer-coated cyan pigment dispersion liquid.
Preparation of Magenta Pigment Dispersion Liquid Using Surfactant
Dispersion Liquid (E)
Formulation

| | |
|---|---|
| Pigment: Pigment Red 122 (CROMOPHTAL JET Magenta DMQ manufactured by Ciba Specialty Chemicals, K.K.) | 200 parts |
| Compound of general formula (2) (n = 40) | 56 parts |
| Distilled water | 744 parts |

The mixture was premixed and was then dispersed with a bead mill disperser (UAM-015 manufactured by KOTOBUKI INDUSTRIES CO., LTD.) using zirconia beads (density: $6.03\times10^{-6}$ g/m$^3$) having a diameter of 0.03 mm under conditions of a peripheral velocity of 10 m/s, a liquid temperature of 30° C., and a dispersion time of 15 min. Coarse particles were centrifuged with a centrifugal separator (Model-3600 manufactured by KUBOTA CORPORATION) to obtain a dispersion liquid (E) having an average particle diameter of 120 nm as a magenta pigment dispersion liquid using a surfactant.
Preparation of Resinous Polymer-Coated Magenta Pigment Dispersion Liquid
Dispersion Liquid (F)
The interior of a 1-L flask equipped with a mechanical stirrer, a thermometer, a nitrogen gas introduction tube, a reflux tube, and a dropping funnel was satisfactorily replaced by nitrogen gas. The flask was charged with 11.2 g of styrene, 2.8 g of acrylic acid, 12.0 g of lauryl methacrylate, 4.0 g of polyethylene glycol methacrylate, 4.0 g of styrene macromer (trade name: AS-6 manufactured by Toa Gosei Chemical Industry Co., Ltd.), and 0.4 g of mercapto ethanol, and the temperature of the flask was raised to 65° C. A liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (trade name: AS-6 manufactured by Toa Gosei Chemical Industry Co., Ltd.), 3.6 g of mercapto ethanol, 2.4 g of azobisdimethylvaleronitrile, and 18 g of methyl ethyl ketone was then added dropwise into the flask over a period of 2.5 hr. After the completion of the dropwise addition, a mixed solution composed of 0.8 g of azobisdimethylvaleronitrile and 18 g of methyl ethyl ketone was added dropwise into the flask over a period of 0.5 hr. The mixture was aged at 65° C. for 1 hr. 0.8 g of azobisdimethylvaleronitrile was then added, and the mixture was aged for additional 1 hr. After the completion of the reaction, 364 g of methyl ethyl ketone was added into the flask to prepare 800 g of a polymer solution having a concentration of 50% by mass.

The polymer solution synthesized above (28 g), 26 g of Pigment Red 122 (CROMOPHTHAL JET Magenta DMQ manufactured by Ciba Specialty Chemicals, K.K.), 13.6 g of a 1 mol/L potassium hydroxide solution, 20 g of methyl ethyl ketone, and 30 g of ion exchanged water were satisfactorily stirred, and the mixture was then kneaded with a three-roll mill. The resultant paste was introduced into 200 g of ion exchanged water, and the mixture was satisfactorily stirred. Methyl ethyl ketone and water were removed by distillation with an evaporator. The residue was premixed and was then dispersed with a bead mill disperser (UAM-015 manufactured by KOTOBUKI INDUSTRIES CO., LTD.) using zirconia beads (density: $6.03\times10^{-6}$ g/m$^3$) having a diameter of 0.03 mm under conditions of a peripheral velocity of 10 m/s, a liquid temperature of 30° C., and a dispersion time of 15 min. Coarse particles were centrifuged with a centrifugal separator (Model-3600 manufactured by KUBOTA CORPORATION) to obtain a dispersion liquid (F) having an average particle diameter of 100 nm as a resinous polymer-coated magenta pigment dispersion liquid.
Preparation of Yellow Pigment Dispersion Liquid Using Surfactant Dispersion Liquid (G)
Formulation

| | |
|---|---|
| Pigment: Pigment Yellow 74 (Yellow No. 43 manufactured by Dainichiseika Color & Chemicals Manufacturing Co., Ltd.,) | 200 parts |
| Compound of general formula (2) (n = 40) | 56 parts |
| Distilled water | 744 parts |

The mixture was premixed and was then dispersed with a bead mill disperser (UAM-015 manufactured by KOTOBUKI INDUSTRIES CO., LTD.) using zirconia beads (density: $6.03\times10^{-6}$ g/m$^3$) having a diameter of 0.03 mm under conditions of a peripheral velocity of 10 m/s, a liquid temperature of 30° C., and a dispersion time of 15 min. Coarse particles were centrifuged with a centrifugal separator (Model-3600 manufactured by KUBOTA CORPORATION) to obtain a dispersion liquid (G) having an average particle diameter of 90 nm as a yellow pigment dispersion liquid using a surfactant.
Preparation of Resinous Polymer-Coated Yellow Pigment Dispersion Liquid
Dispersion Liquid (H)
The interior of a 1-L flask equipped with a mechanical stirrer, a thermometer, a nitrogen gas introduction tube, a reflux tube, and a dropping funnel was satisfactorily replaced by nitrogen gas. The flask was charged with 11.2 g of styrene, 2.8 g of acrylic acid, 12.0 g of lauryl methacrylate, 4.0 g of polyethylene glycol methacrylate, 4.0 g of styrene macromer (trade name: AS-6 manufactured by Toa Gosei Chemical Industry Co., Ltd.), and 0.4 g of mercapto ethanol, and the temperature of the flask was raised to 65° C. A liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (trade name: AS-6 manufactured by Toa Gosei Chemical Industry Co., Ltd.), 3.6 g of mercapto ethanol, 2.4 g of azobisdimethylvaleronitrile, and 18 g of methyl ethyl ketone was then added dropwise into the flask over a period of 2.5 hr. After the completion of the dropwise addition, a mixed solution composed of 0.8 g of azobisdimethylvaleronitrile and 18 g of methyl ethyl ketone was added dropwise into the flask over a period of 0.5 hr. The mixture was aged at 65° C. for 1 hr. To the resultant, 0.8 g of azobisdimethylvaleronitrile was then added, and the resulting mixture was aged for additional 1 hr. After the completion of the reaction, 364 g of methyl ethyl ketone was added into the flask to prepare 800 g of a polymer solution having a concentration of 50% by mass.

The polymer solution synthesized above (28 g), 26 g of Pigment Yellow 74 (Yellow No. 43 manufactured by Dainichiseika Color & Chemicals Manufacturing Co., Ltd.), 13.6 g of a 1 mol/L potassium hydroxide solution, 20 g of methyl ethyl ketone, and 30 g of ion exchanged water were satisfactorily stirred, and the mixture was then kneaded with a three-roll mill. The resultant paste was introduced into 200 g of ion exchanged water, and the mixture was satisfactorily stirred. Methyl ethyl ketone and water were removed by distillation with an evaporator. The residue was premixed and was then dispersed with a bead mill disperser (UAM-015 manufactured by KOTOBUKI INDUSTRIES CO., LTD.) using zirconia beads (density: $6.03 \times 10^{-6}$ g/m$^3$) having a diameter of 0.03 mm under conditions of a peripheral velocity of 10 m/s, a liquid temperature of 30° C., and a dispersion time of 15 min. Coarse particles were centrifuged with a centrifugal separator (Model-3600 manufactured by KUBOTA CORPORATION) to obtain a dispersion liquid (H) having an average particle diameter of 100 nm as a resinous polymer-coated yellow pigment dispersion liquid.

Dispersion Liquid (I)

A dispersion liquid (I) was obtained in the same manner as in the dispersion liquid (A), except that the dispersion time was changed from 15 min in the dispersion liquid (A) to 25 min to bring the average particle diameter of the black pigment dispersion liquid to 95 nm.

Dispersion Liquid (J)

A dispersion liquid (J) was obtained in the same manner as in the dispersion liquid (B), except that the dispersion time was changed from 15 min in the dispersion liquid (B) to 10 min to bring the average particle diameter of the carbon black pigment dispersion liquid to 140 nm.

Dispersion Liquid (K)

A dispersion liquid (K) was obtained in the same manner as in the dispersion liquid (C), except that the dispersion time was changed from 15 min in the dispersion liquid (C) to 20 min to bring the average particle diameter of the cyan pigment dispersion liquid to 70 nm.

Dispersion Liquid (L)

A dispersion liquid (L) was obtained in the same manner as in the dispersion liquid (D), except that the dispersion time was changed from 15 min in the dispersion liquid (D) to 10 min to bring the average particle diameter of the cyan pigment dispersion liquid to 110 nm.

Dispersion Liquid (M)

A dispersion liquid (M) was obtained in the same manner as in the dispersion liquid (E), except that the dispersion time was changed from 15 min in the dispersion liquid (E) to 10 min to bring the average particle diameter of the magenta pigment dispersion liquid to 130 nm.

Dispersion Liquid (N)

A dispersion liquid (N) was obtained in the same manner as in the dispersion liquid (F), except that the dispersion time was changed from 15 min in the dispersion liquid (F) to 20 min to bring the average particle diameter of the magenta pigment dispersion liquid to 90 nm.

Dispersion Liquid (O)

A dispersion liquid (O) was obtained in the same manner as in the dispersion liquid (G), except that the dispersion time was changed from 15 min in the dispersion liquid (G) to 6 min to bring the average particle diameter of the yellow pigment dispersion liquid to 130 nm.

Dispersion Liquid (P)

A dispersion liquid (P) was obtained in the same manner as in the dispersion liquid (H), except that the dispersion time was changed from 15 min in the dispersion liquid (H) to 10 min to bring the average particle diameter of the yellow pigment dispersion liquid to 120 nm.

Dispersion Liquid (Q)

A dispersion liquid (Q) was obtained in the same manner as in the dispersion liquid (A), except that the dispersion time was changed from 15 min in the dispersion liquid (A) to 45 min to bring the average particle diameter of the black pigment dispersion liquid to 50 nm.

Dispersion Liquid (R)

A dispersion liquid (R) was obtained in the same manner as in the dispersion liquid (B), except that the dispersion time was changed from 15 min in the dispersion liquid (B) to 40 min to bring the average particle diameter of the black pigment dispersion liquid to 50 nm.

Dispersion Liquid (S)

A dispersion liquid (S) was obtained in the same manner as in the dispersion liquid (A), except that the dispersion time was changed from 15 min in the dispersion liquid (A) to 5 min to bring the average particle diameter of the black pigment dispersion liquid to 150 nm.

Dispersion Liquid (T)

A dispersion liquid (T) was obtained in the same manner as in the dispersion liquid (B), except that the dispersion time was changed from 15 min in the dispersion liquid (B) to 4 min to bring the average particle diameter of the black pigment dispersion liquid to 150 nm.

Dispersion Liquid (V)

A dispersion liquid (V) was obtained in the same manner as in the dispersion liquid (A), except that the dispersion time was changed from 15 min in the dispersion liquid (A) to 50 min to bring the average particle diameter of the black pigment dispersion liquid to 45 nm.

Dispersion Liquid (W)

A dispersion liquid (W) was obtained in the same manner as in the dispersion liquid (B), except that the dispersion time was changed from 15 min in the dispersion liquid (B) to 45 min to bring the average particle diameter of the black pigment dispersion liquid to 45 nm.

Dispersion Liquid (X)

A dispersion liquid (X) was obtained in the same manner as in the dispersion liquid (A), except that the dispersion time was changed from 15 min in the dispersion liquid (A) to 3 min to bring the average particle diameter of the black pigment dispersion liquid to 155 nm.

Dispersion Liquid (Y)

A dispersion liquid (Y) was obtained in the same manner as in the dispersion liquid (B), except that the dispersion time was changed from 15 min in the dispersion liquid (B) to 3 min to bring the average particle diameter of the black pigment dispersion liquid to 155 nm.

Dispersion Liquid (Z)

A dispersion liquid (Z) was obtained in the same manner as in the dispersion liquid (C), except that the dispersion time was changed from 15 min in the dispersion liquid (C) to 40 min to bring the average particle diameter of the cyan pigment dispersion liquid to 50 nm.

Dispersion Liquid (AA)

A dispersion liquid (AA) was obtained in the same manner as in the dispersion liquid (D), except that the dispersion time was changed from 15 min in the dispersion liquid (D) to 40 min to bring the average particle diameter of the cyan pigment dispersion liquid to 50 nm.

Dispersion Liquid (AB)

A dispersion liquid (AB) was obtained in the same manner as in the dispersion liquid (C), except that the dispersion time was changed from 15 min in the dispersion liquid (C) to 5 min to bring the average particle diameter of the cyan pigment dispersion liquid to 150 nm.

Dispersion Liquid (AC)

A dispersion liquid (AC) was obtained in the same manner as in the dispersion liquid (D), except that the dispersion time was changed from 15 min in the dispersion liquid (D) to 4 min to bring the average particle diameter of the cyan pigment dispersion liquid to 150 nm.

Dispersion Liquid (AD)

A dispersion liquid (AD) was obtained in the same manner as in the dispersion liquid (C), except that the dispersion time was changed from 15 min in the dispersion liquid (C) to 45 min to bring the average particle diameter of the cyan pigment dispersion liquid to 45 nm.

Dispersion Liquid (AE)

A dispersion liquid (AE) was obtained in the same manner as in the dispersion liquid (D), except that the dispersion time was changed from 15 min in the dispersion liquid (D) to 45 min to bring the average particle diameter of the cyan pigment dispersion liquid to 45 nm.

Dispersion Liquid (AF)

A dispersion liquid (AF) was obtained in the same manner as in the dispersion liquid (C), except that the dispersion time was changed from 15 min in the dispersion liquid (C) to 3 min to bring the average particle diameter of the cyan pigment dispersion liquid to 155 nm.

Dispersion Liquid (AG)

A dispersion liquid (AG) was obtained in the same manner as in the dispersion liquid (D), except that the dispersion time was changed from 15 min in the dispersion liquid (D) to 3 min to bring the average particle diameter of the cyan pigment dispersion liquid to 155 nm.

Dispersion Liquid (AH)

A dispersion liquid (AH) was obtained in the same manner as in the dispersion liquid (E), except that the dispersion time was changed from 15 min in the dispersion liquid (E) to 40 min to bring the average particle diameter of the magenta pigment dispersion liquid to 50 nm.

Dispersion Liquid (AI)

A dispersion liquid (AI) was obtained in the same manner as in the dispersion liquid (F), except that the dispersion time was changed from 15 min in the dispersion liquid (F) to 40 min to bring the average particle diameter of the magenta pigment dispersion liquid to 50 nm.

Dispersion Liquid (AJ)

A dispersion liquid (AJ) was obtained in the same manner as in the dispersion liquid (E), except that the dispersion time was changed from 15 min in the dispersion liquid (E) to 4 min to bring the average particle diameter of the magenta pigment dispersion liquid to 150 nm.

Dispersion Liquid (AK)

A dispersion liquid (AK) was obtained in the same manner as in the dispersion liquid (F), except that the dispersion time was changed from 15 min in the dispersion liquid (F) to 5 min to bring the average particle diameter of the magenta pigment dispersion liquid to 150 nm.

Dispersion Liquid (AL)

A dispersion liquid (AL) was obtained in the same manner as in the dispersion liquid (E), except that the dispersion time was changed from 15 min in the dispersion liquid (E) to 45 min to bring the average particle diameter of the magenta pigment dispersion liquid to 45 nm.

Dispersion Liquid (AM)

A dispersion liquid (AM) was obtained in the same manner as in the dispersion liquid (F), except that the dispersion time was changed from 15 min in the dispersion liquid (F) to 45 min to bring the average particle diameter of the magenta pigment dispersion liquid to 45 nm.

Dispersion Liquid (AN)

A dispersion liquid (AN) was obtained in the same manner as in the dispersion liquid (E), except that the dispersion time was changed from 15 min in the dispersion liquid (E) to 3 min to bring the average particle diameter of the magenta pigment dispersion liquid to 155 nm.

Dispersion Liquid (AO)

A dispersion liquid (AO) was obtained in the same manner as in the dispersion liquid (F), except that the dispersion time was changed from 15 min in the dispersion liquid (F) to 3 min to bring the average particle diameter of the magenta pigment dispersion liquid to 155 nm.

Dispersion Liquid (AP)

A dispersion liquid (AP) was obtained in the same manner as in the dispersion liquid (G), except that the dispersion time was changed from 15 min in the dispersion liquid (G) to 40 min to bring the average particle diameter of the yellow pigment dispersion liquid to 50 nm.

Dispersion Liquid (AQ)

A dispersion liquid (AQ) was obtained in the same manner as in the dispersion liquid (H), except that the dispersion time was changed from 15 min in the dispersion liquid (H) to 40 min to bring the average particle diameter of the yellow pigment dispersion liquid to 50 nm.

Dispersion Liquid (AR)

A dispersion liquid (AR) was obtained in the same manner as in the dispersion liquid (G), except that the dispersion time was changed from 15 min in the dispersion liquid (G) to 4 min to bring the average particle diameter of the yellow pigment dispersion liquid to 150 nm.

Dispersion Liquid (AS)

A dispersion liquid (AS) was obtained in the same manner as in the dispersion liquid (H), except that the dispersion time was changed from 15 min in the dispersion liquid (H) to 5 min to bring the average particle diameter of the yellow pigment dispersion liquid to 150 nm.

Dispersion Liquid (AT)

A dispersion liquid (AT) was obtained in the same manner as in the dispersion liquid (G), except that the dispersion time was changed from 15 min in the dispersion liquid (G) to 45 min to bring the average particle diameter of the yellow pigment dispersion liquid to 45 nm.

Dispersion Liquid (AU)

A dispersion liquid (AU) was obtained in the same manner as in the dispersion liquid (H), except that the dispersion time was changed from 15 min in the dispersion liquid (H) to 45 min to bring the average particle diameter of the yellow pigment dispersion liquid to 45 nm.

Dispersion Liquid (AV)

A dispersion liquid (AV) was obtained in the same manner as in the dispersion liquid (G), except that the dispersion time was changed from 15 min in the dispersion liquid (G) to 3 min to bring the average particle diameter of the yellow pigment dispersion liquid to 155 nm.

Dispersion Liquid (AW)

A dispersion liquid (AW) was obtained in the same manner as in the dispersion liquid (H), except that the dispersion time was changed from 15 min in the dispersion liquid (H) to 3 min to bring the average particle diameter of the yellow pigment dispersion liquid to 155 nm.

Dispersion Liquid (AX)

A dispersion liquid (AX) was obtained in the same manner as in the dispersion liquid (A), except that HITENOL 18E (anionic surfactant manufactured by Dai-ichi Kogyo Seiyaku Co., Ltd.) was used as the surfactant.

Dispersion Liquid (AY)

A dispersion liquid (AY) was obtained in the same manner as in the dispersion liquid (A), except that the sodium naphthalene sulfonate-formalin condensate was changed to one, of which the total amount of dimers, trimers, and tetramers of naphthalenesulfonic acid was 20% by mass.

Dispersion Liquid (AZ)

A dispersion liquid (AZ) was obtained in the same manner as in the dispersion liquid (A), except that the sodium naphthalene sulfonate-formalin condensate was changed to one, of which the total amount of dimers, trimers, and tetramers of naphthalenesulfonic acid was 80% by mass.

Dispersion Liquid (BA)

A dispersion liquid (BA) was obtained in the same manner as in the dispersion liquid (A), except that the sodium naphthalene sulfonate-formalin condensate was changed to one, of which the total amount of dimers, trimers, and tetramers of naphthalenesulfonic acid was 18% by mass.

Dispersion Liquid (BB)

A dispersion liquid (BB) was obtained in the same manner as in the dispersion liquid (A), except that the sodium naphthalene sulfonate-formalin condensate was changed to one, of which the total amount of dimers, trimers, and tetramers of naphthalenesulfonic acid was 82% by mass.

Dispersion Liquid (BC)

A dispersion liquid (BC) was obtained in the same manner as in the dispersion liquid (A), except that the sodium naphthalene sulfonate-formalin condensate was incorporated in an amount of 0.01 in terms of a ratio to 1 of the pigment.

Dispersion Liquid (BD)

A dispersion liquid (BD) was obtained in the same manner as in the dispersion liquid (A), except that the sodium naphthalene sulfonate-formalin condensate was incorporated in an amount of 0.5 in terms of a ratio to 1 of the pigment.

Dispersion Liquid (BE)

A dispersion liquid (BE) was obtained in the same manner as in the dispersion liquid (A), except that the sodium naphthalene sulfonate-formalin condensate was incorporated in an amount of 0.005 in terms of a ratio to 1 of the pigment.

Dispersion Liquid (BF)

A dispersion liquid (BF) was obtained in the same manner as in the dispersion liquid (A), except that the sodium naphthalene sulfonate-formalin condensate was incorporated in an amount of 0.55 in terms of a ratio to 1 of the pigment.

Dispersion Liquid (BG)

A dispersion liquid (BG) was obtained in the same manner as in the dispersion liquid (C), except that HITENOL 18E (anionic surfactant manufactured by Dai-ichi Kogyo Seiyaku Co., Ltd.) was used as the surfactant.

Dispersion Liquid (BH)

A dispersion liquid (BH) was obtained in the same manner as in the dispersion liquid (C), except that the compound of general formula (2) (n=40) was changed to a compound of general formula (2) wherein n=20.

Dispersion Liquid (BI)

A dispersion liquid (BI) was obtained in the same manner as in the dispersion liquid (C), except that the compound of general formula (2) (n=40) was changed to a compound of general formula (2) wherein n=200.

Dispersion Liquid (BJ)

A dispersion liquid (BJ) was obtained in the same manner as in the dispersion liquid (C), except that the compound of general formula (2) (n=40) was changed to a compound of general formula (2) wherein n=18.

Dispersion Liquid (BK)

A dispersion liquid (BK) was obtained in the same manner as in the dispersion liquid (C), except that the compound of general formula (2) (n=40) was changed to a compound of general formula (2) wherein n=202.

Dispersion Liquid (BL)

A dispersion liquid (BL) was obtained in the same manner as in the dispersion liquid (C), except that the compound of general formula (2) (n=40) was incorporated in an amount of 0.3 in terms of a ratio to 1 of the pigment.

Dispersion Liquid (BM)

A dispersion liquid (BM) was obtained in the same manner as in the dispersion liquid (C), except that the compound of general formula (2) (n=40) was incorporated in an amount of 2.0 in terms of a ratio to 1 of the pigment.

Dispersion Liquid (BN)

A dispersion liquid (BN) was obtained in the same manner as in the dispersion liquid (C), except that the compound of general formula (2) (n=40) was incorporated in an amount of 0.25 in terms of a ratio to 1 of the pigment.

Dispersion Liquid (BO)

A dispersion liquid (BO) was obtained in the same manner as in the dispersion liquid (C), except that the compound of general formula (2) (n=40) was incorporated in an amount of 2.05 in terms of a ratio to 1 of the pigment Dispersion Liquid (BP)

A dispersion liquid (BP) was obtained in the same manner as in the dispersion liquid (E), except that HITENOL 18E (anionic surfactant manufactured by Dai-ichi Kogyo Seiyaku Co., Ltd.) was used as the surfactant.

Dispersion Liquid (BQ)

A dispersion liquid (BQ) was obtained in the same manner as in the dispersion liquid (E), except that the compound of general formula (2) (n=40) was changed to a compound of general formula (2) wherein n=20.

Dispersion Liquid (BR)

A dispersion liquid (BR) was obtained in the same manner as in the dispersion liquid (E), except that the compound of general formula (2) (n=40) was changed to a compound of general formula (2) wherein n=200.

Dispersion Liquid (BS)

A dispersion liquid (BS) was obtained in the same manner as in the dispersion liquid (E), except that the compound of general formula (2) (n=40) was changed to a compound of general formula (2) wherein n=18.

Dispersion Liquid (BT)

A dispersion liquid (BT) was obtained in the same manner as in the dispersion liquid (E), except that the compound of general formula (2) (n=40) was changed to a compound of general formula (2) wherein n=202.

Dispersion Liquid (BU)

A dispersion liquid (BU) was obtained in the same manner as in the dispersion liquid (E), except that the compound of general formula (2) (n=40) was incorporated in an amount of 0.3 in terms of a ratio to 1 of the pigment.

Dispersion Liquid (BV)

A dispersion liquid (BV) was obtained in the same manner as in the dispersion liquid (E), except that the compound of general formula (2) (n=40) was incorporated in an amount of 2.0 in terms of a ratio to 1 of the pigment.

Dispersion Liquid (BW)

A dispersion liquid (BW) was obtained in the same manner as in the dispersion liquid (E), except that the compound of general formula (2) (n=40) was incorporated in an amount of 0.25 in terms of a ratio to 1 of the pigment.

Dispersion Liquid (BX)

A dispersion liquid (BX) was obtained in the same manner as in the dispersion liquid (E), except that the compound of general formula (2) (n=40) was incorporated in an amount of 2.05 in terms of a ratio to 1 of the pigment.

Dispersion Liquid (BY)

A dispersion liquid (BY) was obtained in the same manner as in the dispersion liquid (G), except that HITENOL 18E (anionic surfactant manufactured by Dai-ichi Kogyo Seiyaku Co., Ltd.) was used as the surfactant.

Dispersion Liquid (BZ)

A dispersion liquid (BZ) was obtained in the same manner as in the dispersion liquid (G), except that the compound of general formula (2) (n=40) was changed to a compound of general formula (2) wherein n=20.

Dispersion Liquid (CA)

A dispersion liquid (CA) was obtained in the same manner as in the dispersion liquid (G), except that the compound of general formula (2) (n=40) was changed to a compound of general formula (2) wherein n=200.

Dispersion Liquid (CB)

A dispersion liquid (CB) was obtained in the same manner as in the dispersion liquid (G), except that the compound of general formula (2) (n=40) was changed to a compound of general formula (2) wherein n=18.

Dispersion Liquid (CC)

A dispersion liquid (CC) was obtained in the same manner as in the dispersion liquid (G), except that the compound of general formula (2) (n=40) was changed to a compound of general formula (2) wherein n=202.

Dispersion Liquid (CD)

A dispersion liquid (CD) was obtained in the same manner as in the dispersion liquid (G), except that the compound of general formula (2) (n=40) was incorporated in an amount of 0.3 in terms of a ratio to 1 of the pigment.

Dispersion Liquid (CE)

A dispersion liquid (CE) was obtained in the same manner as in the dispersion liquid (G), except that the compound of general formula (2) (n=40) was incorporated in an amount of 2.0 in terms of a ratio to 1 of the pigment.

Dispersion Liquid (CF)

A dispersion liquid (CF) was obtained in the same manner as in the dispersion liquid (G), except that the compound of general formula (2) (n=40) was incorporated in an amount of 0.25 in terms of a ratio to 1 of the pigment.

Dispersion Liquid (CG)

A dispersion liquid (CD) was obtained in the same manner as in the dispersion liquid (G), except that the compound of general formula (2) (n=40) was incorporated in an amount of 2.05 in terms of a ratio to 1 of the pigment.

Dispersion Liquid (CH)

A dispersion liquid (CH) was obtained in the same manner as in the dispersion liquid (A), except that the dispersion time was changed from 15 min to 40 min to bring the average particle diameter of the black pigment dispersion liquid to 80 nm.

Dispersion Liquid (CI)

A dispersion liquid (CI) was obtained in the same manner as in the dispersion liquid (B), except that the dispersion time was changed from 15 min to 5 min to bring the average particle diameter of the carbon black pigment dispersion liquid to 145 nm.

Dispersion Liquid (CJ)

A dispersion liquid (CJ) was obtained in the same manner as in the dispersion liquid (C), except that the dispersion time was changed from 15 min to 30 min to bring the average particle diameter of the cyan pigment dispersion liquid to 60 nm.

Dispersion Liquid (CK)

A dispersion liquid (CK) was obtained in the same manner as in the dispersion liquid (D), except that the dispersion time was changed from 15 min to 5 min to bring the average particle diameter of the cyan pigment dispersion liquid to 120 nm.

Dispersion Liquid (CL)

A dispersion liquid (CL) was obtained in the same manner as in the dispersion liquid (E), except that the dispersion time was changed from 15 min to 5 min to bring the average particle diameter of the magenta pigment dispersion liquid to 140 nm.

Dispersion Liquid (CM)

A dispersion liquid (CM) was obtained in the same manner as in the dispersion liquid (F), except that the dispersion time was changed from 15 min to 25 min to bring the average particle diameter of the magenta pigment dispersion liquid to 80 nm.

Dispersion Liquid (CN)

A dispersion liquid (CN) was obtained in the same manner as in the dispersion liquid (G), except that the dispersion time was changed from 15 min to 3 min to bring the average particle diameter of the yellow pigment dispersion liquid to 140 nm.

Dispersion Liquid (CO)

A dispersion liquid (CO) was obtained in the same manner as in the dispersion liquid (H), except that the dispersion time was changed from 15 min to 5 min to bring the average particle diameter of the yellow pigment dispersion liquid to 130 nm.

Examples 1 to 61 and Comparative Examples 1 to 11

The pigment dispersion liquids thus obtained were used to prepare combinations of No. 1 to No. 69 as shown in Tables 1-1 and 1-2.

TABLE 1-1

| Combination | Cyan Surfactant | Cyan Coating resin | Magenta Surfactant | Magenta Coating resin | Yellow Surfactant | Yellow Coating resin | Black Surfactant | Black Coating resin |
|---|---|---|---|---|---|---|---|---|
| No. 1 | C | D | E | F | G | H | A | B |
| No. 2 | C | D | E | F | G | H | I | B |
| No. 3 | C | D | E | F | G | H | A | J |
| No. 4 | K | D | E | F | G | H | A | B |
| No. 5 | C | L | E | F | G | H | A | B |
| No. 6 | C | D | M | F | G | H | A | B |
| No. 7 | C | D | E | N | G | H | A | B |
| No. 8 | C | D | E | F | O | H | A | B |
| No. 9 | C | D | E | F | G | P | A | B |
| No. 10 | C | D | E | F | G | H | Q | R |
| No. 11 | C | D | E | F | G | H | S | T |
| No. 12 | C | D | E | F | G | H | V | W |
| No. 13 | C | D | E | F | G | H | X | Y |
| No. 14 | Z | AA | E | F | G | H | A | B |
| No. 15 | AB | AC | E | F | G | H | A | B |
| No. 16 | AD | AE | E | F | G | H | A | B |
| No. 17 | AF | AG | E | F | G | H | A | B |
| No. 18 | C | D | AH | AI | G | H | A | B |
| No. 19 | C | D | AJ | AK | G | H | A | B |
| No. 20 | C | D | AL | AM | G | H | A | B |
| No. 21 | C | D | AN | AO | G | H | A | B |
| No. 22 | C | D | E | F | AP | AQ | A | B |
| No. 23 | C | D | E | F | AR | AS | A | B |
| No. 24 | C | D | E | F | AT | AU | A | B |
| No. 25 | C | D | E | F | AV | AW | A | B |
| No. 26 | C | D | E | F | G | H | AX | B |
| No. 27 | C | D | E | F | G | H | AY | B |
| No. 28 | C | D | E | F | G | H | AZ | B |
| No. 29 | C | D | E | F | G | H | BA | B |
| No. 30 | C | D | E | F | G | H | BB | B |
| No. 31 | C | D | E | F | G | H | BC | B |
| No. 32 | C | D | E | F | G | H | BD | B |
| No. 33 | C | D | E | F | G | H | BE | B |
| No. 34 | C | D | E | F | G | H | BF | B |
| No. 35 | BG | D | E | F | G | H | A | B |
| No. 36 | BH | D | E | F | G | H | A | B |
| No. 37 | BI | D | E | F | G | H | A | B |
| No. 38 | BJ | D | E | F | G | H | A | B |
| No. 39 | BK | D | E | F | G | H | A | B |
| No. 40 | BL | D | E | F | G | H | A | B |
| No. 41 | BM | D | E | F | G | H | A | B |
| No. 42 | BN | D | E | F | G | H | A | B |
| No. 43 | BO | D | E | F | G | H | A | B |
| No. 44 | C | D | BP | F | G | H | A | B |
| No. 45 | C | D | BQ | F | G | H | A | B |
| No. 46 | C | D | BR | F | G | H | A | B |
| No. 47 | C | D | BS | F | G | H | A | B |
| No. 48 | C | D | BT | F | G | H | A | B |
| No. 49 | C | D | BU | F | G | H | A | B |
| No. 50 | C | D | BV | F | G | H | A | B |

TABLE 1-2

| Combination | Cyan Surfactant | Cyan Coating resin | Magenta Surfactant | Magenta Coating resin | Yellow Surfactant | Yellow Coating resin | Black Surfactant | Black Coating resin |
|---|---|---|---|---|---|---|---|---|
| No. 51 | C | D | BW | F | G | H | A | B |
| No. 52 | C | D | BX | F | G | H | A | B |
| No. 53 | C | D | E | F | BY | H | A | B |
| No. 54 | C | D | E | F | BZ | H | A | B |
| No. 55 | C | D | E | F | CA | H | A | B |
| No. 56 | C | D | E | F | CB | H | A | B |
| No. 57 | C | D | E | F | CC | H | A | B |
| No. 58 | C | D | E | F | CD | H | A | B |
| No. 59 | C | D | E | F | CE | H | A | B |
| No. 60 | C | D | E | F | CF | H | A | B |
| No. 61 | C | D | E | F | CG | H | A | B |
| No. 62 | C | D | E | F | G | H | CH | B |
| No. 63 | C | D | E | F | G | H | A | CI |
| No. 64 | CJ | D | E | F | G | H | A | B |

TABLE 1-2-continued

| Combination | Cyan Surfactant | Cyan Coating resin | Magenta Surfactant | Magenta Coating resin | Yellow Surfactant | Yellow Coating resin | Black Surfactant | Black Coating resin |
|---|---|---|---|---|---|---|---|---|
| No. 65 | C | CK | E | F | G | H | A | B |
| No. 66 | C | D | CL | F | G | H | A | B |
| No. 67 | C | D | E | CM | G | H | A | B |
| No. 68 | C | D | E | F | CN | H | A | B |
| No. 69 | C | D | E | F | G | CO | A | B |

Inks were each prepared according to the following formulation using the combination of the pigment dispersion liquid in which the pigment was dispersed in water using the surfactant and the resinous polymer-coated pigment dispersion liquids in which the pigment coated with the resinous polymer was dispersed in water, as described in Tables 1-1 and 1-2. Formulation of each ink

| | |
|---|---|
| Pigment (total solid content 8%) | 40.0 parts |
| Glycerin | 20.0 parts |
| Diethylene glycol | 10.0 parts |
| 2-Ethyl-1,3-hexanediol | 3.0 parts |
| 2-Pyrrolidone | 3.0 parts |
| Resin emulsion | 2.0 parts |
| Distilled water | 22.0 parts |

The pigment in the above formulation was one obtained by mixing, at a mass ratio of 1:1, the pigment dispersion liquid in which the pigment was dispersed in water using the surfactant with the resinous polymer-coated pigment dispersion liquid in which the resinous polymer-coated pigment was dispersed in water.

The resin emulsion in the formulation was selected from resin emulsions described in Table 2. The combinations are shown in Tables 3-1 and 3-2.

Inks were each prepared by stirring the ingredients according to the formulation for 30 min, then filtering the mixture through a membrane filter having a pore diameter of 0.8 and subjecting the filtrate to vacuum deairing and were combined to form ink sets of Examples 1 to 61 and Comparative Examples 1 to 11. The ink sets are shown in Tables 3-1 and 3-2.

TABLE 2

| Name of resin emulsion | Type (trade name, manufacturer) |
|---|---|
| a | Aqueous polyurethane resin (XW-75-W920; acid value 66; manufactured by Mitsui Chemicals Inc.) Anionic self-emulsifying ether polyurethane |
| b | Aqueous polyurethane resin (SF460S, manufactured by Dai-Ichi Kogyo Seiyaku Co., Ltd.) Anionic self-emulsifying carbonate polyurethane |
| c | Styrene acrylic resin (J840; acid value 87; manufactured by BASF) |

TABLE 3-1

| Ink | Combination of Table 1 | Aqueous polyurethane resin |
|---|---|---|
| Ex. 1 | No. 1 | a |
| Ex. 2 | No. 2 | a |
| Ex. 3 | No. 3 | a |
| Ex. 4 | No. 4 | a |
| Ex. 5 | No. 5 | a |
| Ex. 6 | No. 6 | a |
| Ex. 7 | No. 7 | a |
| Ex. 8 | No. 8 | a |
| Ex. 9 | No. 9 | a |
| Ex. 10 | No. 10 | a |
| Ex. 11 | No. 11 | a |
| Ex. 12 | No. 12 | a |
| Ex. 13 | No. 13 | a |
| Ex. 14 | No. 14 | a |
| Ex. 15 | No. 15 | a |
| Ex. 16 | No. 16 | a |
| Ex. 17 | No. 17 | a |
| Ex. 18 | No. 18 | a |
| Ex. 19 | No. 19 | a |
| Ex. 20 | No. 20 | a |
| Ex. 21 | No. 21 | a |
| Ex. 22 | No. 22 | a |
| Ex. 23 | No. 23 | a |
| Ex. 24 | No. 24 | a |
| Ex. 25 | No. 25 | a |
| Ex. 26 | No. 26 | a |
| Ex. 27 | No. 27 | a |
| Ex. 28 | No. 28 | a |
| Ex. 29 | No. 29 | a |
| Ex. 30 | No. 30 | a |
| Ex. 31 | No. 31 | a |
| Ex. 32 | No. 32 | a |
| Ex. 33 | No. 33 | a |
| Ex. 34 | No. 34 | a |
| Ex. 35 | No. 35 | a |
| Ex. 36 | No. 36 | a |
| Ex. 37 | No. 37 | a |
| Ex. 38 | No. 38 | a |
| Ex. 39 | No. 39 | a |
| Ex. 40 | No. 40 | a |
| Ex. 41 | No. 41 | a |
| Ex. 42 | No. 42 | a |
| Ex. 43 | No. 43 | a |
| Ex. 44 | No. 44 | a |
| Ex. 45 | No. 45 | a |
| Ex. 46 | No. 46 | a |
| Ex. 47 | No. 47 | a |
| Ex. 48 | No. 48 | a |
| Ex. 49 | No. 49 | a |
| Ex. 50 | No. 50 | a |

TABLE 3-2

| Ink | Combination of Table 1 | Aqueous polyurethane resin |
|---|---|---|
| Ex. 51 | No. 51 | a |
| Ex. 52 | No. 52 | a |
| Ex. 53 | No. 53 | a |

TABLE 3-2-continued

| Ink | Combination of Table 1 | Aqueous polyurethane resin |
|---|---|---|
| Ex. 54 | No. 54 | a |
| Ex. 55 | No. 55 | a |
| Ex. 56 | No. 56 | a |
| Ex. 57 | No. 57 | a |
| Ex. 58 | No. 58 | a |
| Ex. 59 | No. 59 | a |
| Ex. 60 | No. 60 | a |
| Ex. 61 | No. 61 | a |
| Comp. Ex. 1 | No. 62 | a |
| Comp. Ex. 2 | No. 63 | a |
| Comp. Ex. 3 | No. 64 | a |
| Comp. Ex. 4 | No. 65 | a |
| Comp. Ex. 5 | No. 66 | a |
| Comp. Ex. 6 | No. 67 | a |
| Comp. Ex. 7 | No. 68 | a |
| Comp. Ex. 8 | No. 69 | a |
| Comp. Ex. 9 | No. 1 | — |
| Comp. Ex. 10 | No. 1 | b |
| Comp. Ex. 11 | No. 1 | c |

The inkjet recording ink sets of Examples 1 to 61 and Comparative Examples 1 to 11 were filled into an ink pack for an inkjet printer IPSiO GX 5000 manufactured by Ricoh Co., Ltd. to prepare an ink cartridge.

Printing was performed in a composite mode on POD GLOSS COAT (gloss paper) manufactured by Oji Paper Co., Ltd. Black printed images were measured with an Xrite densitometer. Further, ejection stability and ink storage stability were evaluated by the following testing methods. The results are shown in Tables 4-1 and 4-2.

<Evaluation 1: Evaluation of Image>

The density of images was measured by subjecting solid images, which are image samples, to color measurement with an Xrite densitometer.

BK
    I: 1.80 or more
    II: 1.50 or more but less than 1.80
    III: less than 1.50

<Evaluation 2: Evaluation of Ejection Property>

The printer is placed in a thermo-hygrostat, and the environment within the thermo-hygrostat was set to a temperature of 32° C. and a humidity of 30% RH. The following printing pattern chart was continuously printed on 20 sheets of paper, and the printing was then brought to a stopped state period for 20 min where the printing was not carried out. The procedure was repeated 50 times to print 1,000 sheets of paper. A nozzle check pattern was then printed, and the number of dropouts was counted to evaluate the ejection property.

—Printing Pattern Chart—

For the printing pattern, each ink was printed at 100% duty in a chart having an image area with a printing area of 5% for each color of the whole area of the paper. The printing was performed under conditions of a recording density of 300 dpi (dots per inch) (1 inch being 25.4 mm) by one-pass printing.

[Evaluation Criteria]
    I: No droplets in nozzle check patterns of Y, M, C, and BK
    II: Droplets in any of nozzle check patterns of Y, M, C, and BK
    III: Droplets in all of nozzle check patterns of Y, M, C, and BK <Evaluation 3: Evaluation of Ink Storage Stability>

The yellow, magenta, cyan, and black inks were mixed at a weight ratio of 1:1:1:1. The mixed ink was placed in a polyethylene vessel, and the vessel was hermetically sealed and stored at 70° C. for 3 weeks. The particle diameter, the surface tension, and the viscosity were measured, and the percentage change from the initial property was determined. The ink storage stability was evaluated based on the percentage change.

The surface tension of the inkjet recording inks in the present invention was measured with KRUSS K-10ST in an environment of 23° C. and 55% RH.

The viscosity of the inkjet recording inks in the present invention was measured with RE-80L manufactured by Toki Sangyo Co., Ltd. under conditions of 23° C. and 55% RH.

[Evaluation Criteria]
    I: A percentage change of 10% or less for all of particle diameter, surface tension, and viscosity
    II: A percentage change of more than 10% for at least one of particle diameter, surface tension, and viscosity
    III: A percentage change of more than 10% for all of particle diameter, surface tension, and viscosity

TABLE 4-1

| Type of ink | Evaluation of image | Ejection property | Storage stability of ink |
|---|---|---|---|
| Ex. 1 | I | I | I |
| Ex. 2 | I | I | I |
| Ex. 3 | I | I | I |
| Ex. 4 | I | I | I |
| Ex. 5 | I | I | I |
| Ex. 6 | I | I | I |
| Ex. 7 | I | I | I |
| Ex. 8 | I | I | I |
| Ex. 9 | I | I | I |
| Ex. 10 | I | I | I |
| Ex. 11 | I | I | I |
| Ex. 12 | I | I | II |
| Ex. 13 | I | II | I |
| Ex. 14 | I | I | I |
| Ex. 15 | I | I | I |
| Ex. 16 | I | I | II |
| Ex. 17 | I | II | I |
| Ex. 18 | I | I | I |
| Ex. 19 | I | I | I |
| Ex. 20 | I | I | II |
| Ex. 21 | I | II | I |
| Ex. 22 | I | I | I |
| Ex. 23 | I | I | I |
| Ex. 24 | I | I | II |
| Ex. 25 | I | II | I |
| Ex. 26 | I | I | II |
| Ex. 27 | I | I | I |
| Ex. 28 | I | I | I |
| Ex. 29 | I | I | II |
| Ex. 30 | I | I | II |
| Ex. 31 | I | I | I |
| Ex. 32 | I | I | I |
| Ex. 33 | I | I | II |
| Ex. 34 | I | II | II |
| Ex. 35 | I | I | II |
| Ex. 36 | I | I | I |
| Ex. 37 | I | I | I |
| Ex. 38 | I | I | II |
| Ex. 39 | I | I | II |
| Ex. 40 | I | I | I |
| Ex. 41 | I | I | I |
| Ex. 42 | I | I | II |
| Ex. 43 | I | II | II |
| Ex. 44 | I | I | II |
| Ex. 45 | I | I | I |
| Ex. 46 | I | I | I |
| Ex. 47 | I | I | II |
| Ex. 48 | I | I | II |
| Ex. 49 | I | I | I |
| Ex. 50 | I | I | I |

TABLE 4-2

| Type of ink | Evaluation of image | Ejection property | Storage stability of ink |
|---|---|---|---|
| Ex. 51 | I | I | II |
| Ex. 52 | I | II | II |
| Ex. 53 | I | I | II |
| Ex. 54 | I | I | I |
| Ex. 55 | I | I | I |
| Ex. 56 | I | I | II |
| Ex. 57 | I | I | II |
| Ex. 58 | I | I | I |
| Ex. 59 | I | I | I |
| Ex. 60 | I | I | II |
| Ex. 61 | I | II | II |
| Comp. Ex. 1 | III | II | II |
| Comp. Ex. 2 | III | III | I |
| Comp. Ex. 3 | III | I | II |
| Comp. Ex. 4 | III | II | I |
| Comp. Ex. 5 | III | II | I |
| Comp. Ex. 6 | III | I | III |
| Comp. Ex. 7 | III | III | II |
| Comp. Ex. 8 | III | III | II |
| Comp. Ex. 9 | II | III | III |
| Comp. Ex. 10 | II | III | I |
| Comp. Ex. 11 | II | II | III |

The embodiments of the present invention are as follows.
<1> An inkjet recording ink set, containing:
a cyan ink;
a magenta ink;
a yellow ink; and
a black ink,
wherein the cyan ink, the magenta ink, the yellow ink, and the black ink each contain at least a pigment, a surfactant, water, a water-soluble organic solvent, and an anionic self-emulsifying ether-based polyurethane,
wherein each ink contains, as the pigment, a combination of a (i) pigment dispersion liquid, in which the pigment is dispersed in water with assistance of the surfactant, and a (ii) resinous polymer-coated pigment dispersion liquid, in which the pigment is coated with a resinous polymer, and the resinous polymer-coated pigment is dispersed in water, and
wherein the (i) pigment dispersion liquid and the (ii) resinous polymer-coated pigment dispersion liquid satisfy the following formula:

$$|A-B| \leq 30 \text{ nm}$$

where A is the average particle diameter (D50) of the dispersed pigment in the (i) pigment dispersion liquid, and B is the average particle diameter (D50) of the dispersed resinous polymer-coated pigment in the (ii) pigment dispersion liquid.
<2> The inkjet recording ink set according to <1>, wherein the cyan ink, the magenta ink, the yellow ink, and the black ink are each a dispersion liquid including dispersed particles having the average particle diameter (D50) of 50 nm to 150 nm.
<3> The inkjet recording ink set according to any of <1> or <2>, wherein the surfactant contained in the black ink is a sodium naphthalene sulfonate-formalin condensate in which the total amount of dimmers, trimers, and tetramers of naphthalene sulfonic acid is 20% by mass to 80% by mass, and
wherein the (i) pigment dispersion liquid contains the surfactant in an amount of 0.01 to 0.5 relative to 1 of the pigment on the weight basis.
<4> The inkjet recording ink set according to any one of <1> to <3>, wherein the surfactant contained in each of the cyan ink, magenta ink, and yellow ink is a compound represented by the following general formula (1):

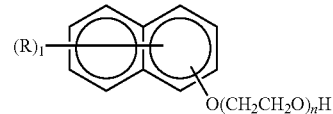
General Formula (1)

where R is a C1-C20 alkyl group, an allyl group, or an aralkyl group; l is an integer of 0 to 7; and n is an integer of 20 to 200, and
wherein the (i) pigment dispersion liquid contains the surfactant in an amount of 0.3 to 2.0 relative to 1 of the pigment on the weight basis.
<5> The inkjet recording ink set according to any one of <1> to <4>, wherein the surfactant contained in each of the cyan ink, magenta ink, and yellow ink is POE (n=40) β-nepthyl ether.
<6> An ink cartridge, containing:
a cartridge case; and
an ink constituting the inkjet recording ink set as defined in any one of <1> to <5>.
<7> An inkjet recording device, containing:
the inkjet recording ink set as defined in any one of <1> to <5>; and
a head configured to eject an ink constituting the ink set to perform recording.
<8> An inkjet recording method, containing:
ejecting an ink by means of the inkjet recording device as defined in <7>.
<9> An image formed matter, containing:
a recording medium;
an image formed on the recording medium by the inkjet recording method as defined in <8>.
<10> The image formed matter according to <9>, wherein the recording medium is paper.

REFERENCE SIGNS LIST 1 recording head
2 body casing
16 gear mechanism
17 subscanning motor
18 carriage
20 recording liquid cartridge
21 guide shaft
22 guide shaft
23 timing belt
24 main scanning motor
25 main scanning motor
26 main scanning motor
27 main scanning motor

The invention claimed is:
1. An inkjet recording ink set, comprising:
a cyan ink;
a magenta ink;
a yellow ink; and
a black ink,
wherein the cyan ink, the magenta ink, the yellow ink, and the black ink each comprise a pigment, a surfactant, water, a water-soluble organic solvent, and an anionic self-emulsifying ether-based polyurethane,
wherein the pigment comprises a combination of
a (i) pigment dispersion liquid, in which the pigment is dispersed in water with assistance of the surfactant, and
a (ii) resinous polymer-coated pigment dispersion liquid, in which the pigment is coated with a resinous polymer, thereby forming a resinous polymer-coated pigment, and the resinous polymer-coated pigment is dispersed in water, and wherein the (i) pigment dispersion liquid and the (ii) resinous polymer-coated pigment dispersion liquid satisfy formula:

$|A-B| \leq 30$ nm, where A is an average particle diameter of a dispersed pigment in the (i) pigment dispersion liquid, and B is an average particle diameter of a dispersed resinous polymer-coated pigment in the (ii) pigment dispersion liquid.

2. The inkjet recording ink set according to claim 1, wherein the cyan ink, the magenta ink, the yellow ink, and the black ink are each a dispersion liquid comprising dispersed particles having an average particle diameter of from 50 nm to 150 nm.

3. The inkjet recording ink set according to claim 1, wherein the surfactant in the black ink is a sodium naphthalene sulfonate-formalin condensate in which a total amount of dimmers, trimers, and tetramers of naphthalene sulfonic acid is from 20% by mass to 80% by mass, and wherein the (i) pigment dispersion liquid comprises the surfactant in an amount of from 0.01 to 0.5 relative to 1 of the pigment on a weight basis.

4. The inkjet recording ink set according to claim 1, wherein the surfactant in each of the cyan ink, magenta ink, and yellow ink is a compound represented by formula:

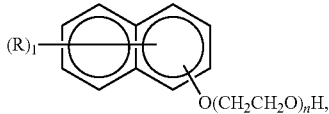

Formula where R is a C1-C20 alkyl group, an allyl group, or an aralkyl group;

l is an integer of from 0 to 7; and n is an integer of from 20 to 200, and wherein the (i) pigment dispersion liquid comprises the surfactant in an amount of from 0.3 to 2.0 relative to l of the pigment on a weight basis.

5. The inkjet recording ink set according to claim 4, wherein the surfactant in each of the cyan ink, magenta ink, and yellow ink is polyoxyethylene (n=40) β-nepthyl ether.

6. An ink cartridge, comprising:
a cartridge case; and
an ink constituting an inkjet recording ink set,
wherein the inkjet recording ink set comprises:
a cyan ink;
a magenta ink;
a yellow ink; and
a black ink,
wherein the cyan ink, the magenta ink, the yellow ink, and the black ink each comprise a pigment, a surfactant, water, a water-soluble organic solvent, and an anionic self-emulsifying ether-based polyurethane,
wherein the pigment comprises a combination of
a (i) pigment dispersion liquid, in which the pigment is dispersed in water with assistance of the surfactant, and
a (ii) resinous polymer-coated pigment dispersion liquid, in which the pigment is coated with a resinous polymer, thereby forming a resinous polymer-coated pigment, and the resinous polymer-coated pigment is dispersed in water, and wherein the (i) pigment dispersion liquid and the (ii) resinous polymer-coated pigment dispersion liquid satisfy formula:

$|A-B| \leq 30$ nm where A is an average particle diameter of a dispersed pigment in the (i) pigment dispersion liquid, and B is an average particle diameter of a dispersed resinous polymer-coated pigment in the (ii) pigment dispersion liquid.

7. An inkjet recording device, comprising:
an inkjet recording ink set; and
a head configured to eject an ink constituting the inkjet recording ink set to perform recording,
wherein the inkjet recording ink set comprises:
a cyan ink;
a magenta ink;
a yellow ink; and
a black ink,
wherein the cyan ink, the magenta ink, the yellow ink, and the black ink each comprise a pigment, a surfactant, water, a water-soluble organic solvent, and an anionic self-emulsifying ether-based polyurethane,
wherein the pigment comprises a combination of
a (i) pigment dispersion liquid, in which the pigment is dispersed in water with assistance of the surfactant, and
a (ii) resinous polymer-coated pigment dispersion liquid, in which the pigment is coated with a resinous polymer, thereby forming a resinous polymer-coated pigment, and the resinous polymer-coated pigment is dispersed in water, and wherein the (i) pigment dispersion liquid and the (ii) resinous polymer-coated pigment dispersion liquid satisfy formula:

$|A-B| \leq 30$ nm where A is an average particle diameter of a dispersed pigment in the (i) pigment dispersion liquid, and B is an average particle diameter of a dispersed resinous polymer-coated pigment in the (ii) pigment dispersion liquid.

8. The inkjet recording ink set according to claim 1, wherein the resinous polymer comprises a styrene resin or a (meth)acrylic resin.

9. The inkjet recording ink set according to claim 1, wherein the resinous polymer is a copolymer of a (meth)acrylic acid and at least one monomer selected from the group consisting of a styrene, a substituted styrene and a (meth)acrylic acid ester, the copolymer being at least partially neutralized with a base.

10. The inkjet recording ink set according to claim 3, wherein the resinous polymer comprises a styrene resin or a (meth)acrylic resin.

11. The inkjet recording ink set according to claim 3, wherein the resinous polymer is a copolymer of a (meth)acrylic acid and at least one monomer selected from the group consisting of a styrene, a substituted styrene and a (meth)acrylic acid ester, the copolymer being at least partially neutralized with a base.

12. The inkjet recording ink set according to claim 4, wherein the resinous polymer comprises a styrene resin or a (meth)acrylic resin.

13. The inkjet recording ink set according to claim 4,
wherein the resinous polymer is a copolymer of a (meth) acrylic acid and at least one monomer selected from the group consisting of a styrene, a substituted styrene and a (meth)acrylic acid ester, the copolymer being at least partially neutralized with a base.

14. The inkjet recording ink set according to claim 1,
wherein the (i) pigment dispersion liquid and the (ii) resinous polymer-coated pigment dispersion liquid satisfy formula:

$|A-B| \leq 15$ nm.

15. The ink cartridge according to claim 6,
wherein the (i) pigment dispersion liquid and the (ii) resinous polymer-coated pigment dispersion liquid satisfy formula:

$|A-B| \leq 15$ nm.

16. The inkjet recording device according to claim 7,
wherein the (i) pigment dispersion liquid and the (ii) resinous polymer-coated pigment dispersion liquid satisfy formula:

$|A-B| \leq 15$ nm.

17. An inkjet recording ink set, comprising:
a cyan ink;
a magenta ink;
a yellow ink; and
a black ink,
wherein the cyan ink, the magenta ink, the yellow ink, and the black ink each comprise a pigment, a surfactant, water, a water-soluble organic solvent, and an anionic ether-based polyurethane,
wherein the pigment comprises:
a (i) pigment, in which the pigment is dispersed with assistance of the surfactant; and
a (ii) resinous polymer-coated pigment, in which the pigment is coated with a resinous polymer, thereby forming a resinous polymer-coated pigment, and wherein the (i) pigment and the (ii) resinous polymer-coated pigment satisfy formula:

$|A-B| \leq 30$ nm, where A is an average particle diameter of the (i) pigment, and B is an average particle diameter of the (ii) pigment.

18. The inkjet recording ink set according to claim 17,
wherein the resinous polymer comprises a styrene resin or a (meth)acrylic resin.

19. The inkjet recording ink set according to claim 17,
wherein the resinous polymer is a copolymer of a (meth) acrylic acid and at least one monomer selected from the group consisting of a styrene, a substituted styrene and a (meth)acrylic acid ester, the copolymer being at least partially neutralized with a base.

20. The inkjet recording ink set according to claim 17,
wherein the (i) pigment and the (ii) resinous polymer-coated pigment satisfy formula:

$|A-B| \leq 15$ nm.

* * * * *